US011373005B2

(12) United States Patent
Shemer et al.

(10) Patent No.: US 11,373,005 B2
(45) Date of Patent: Jun. 28, 2022

(54) PRIVACY-PRESERVING DATA COLLECTION

(71) Applicant: WalkMe Ltd., Tel-Aviv (IL)

(72) Inventors: Moran Shemer, Ra'anana (IL); Nir Nahum, Tel-Aviv (IL); Ron Zohar, Givatayim (IL)

(73) Assignee: WALKME LTD., Tel Aviv (IL)

(*) Notice: Subject to any disclaimer, the term of this patent is extended or adjusted under 35 U.S.C. 154(b) by 164 days.

(21) Appl. No.: 16/988,904

(22) Filed: Aug. 10, 2020

(65) Prior Publication Data

US 2022/0043932 A1 Feb. 10, 2022

(51) Int. Cl.

*G06F 21/00* (2013.01)
*G06F 21/62* (2013.01)
*G06F 9/451* (2018.01)
*G06F 40/268* (2020.01)
*G06F 16/903* (2019.01)
*G06F 40/205* (2020.01)
*G06F 21/60* (2013.01)

(52) U.S. Cl.

CPC .......... *G06F 21/6245* (2013.01); *G06F 9/451* (2018.02); *G06F 16/90344* (2019.01); *G06F 21/602* (2013.01); *G06F 40/205* (2020.01); *G06F 40/268* (2020.01)

(58) Field of Classification Search

CPC ................. G06F 21/6245; G06F 9/451; G06F 16/90344; G06F 21/602; G06F 40/205; G06F 40/268; G06F 21/6254; G06F 40/151; G06F 40/279

See application file for complete search history.

(56) References Cited

U.S. PATENT DOCUMENTS

| | | | | |
|---|---|---|---|---|
| 9,323,818 | B1 * | 4/2016 | Kothari | G06F 16/258 |
| 10,936,744 | B1 * | 3/2021 | Trepetin | H04L 9/0861 |
| 11,271,724 | B2 * | 3/2022 | Ragan | H04L 9/0827 |
| 2012/0303616 | A1 | 11/2012 | Abuelsaad et al. | |
| 2015/0309984 | A1 * | 10/2015 | Bradford | G06F 40/263 704/8 |
| 2016/0292436 | A1 | 10/2016 | Matzkel | |
| 2017/0124037 | A1 | 5/2017 | Hayashi et al. | |
| 2020/0042739 | A1 | 2/2020 | Cheng et al. | |

(Continued)

FOREIGN PATENT DOCUMENTS

EP 3502947 A1 6/2019

OTHER PUBLICATIONS

International search report and written opinion issued by the Israel Patent Office for corresponding International Patent Application No. PCT/IL2021/050942, dated Sep. 19, 2021.

*Primary Examiner* — Kendall Dolly
(74) *Attorney, Agent, or Firm* — Myers Wolin, LLC

(57) ABSTRACT

A method, system and product including: obtaining a graphical user interface (GUI) element of a GUI of the end device, wherein the GUI element is associated with a text string that is included in the GUI; transforming at least a portion of the text string according to a transformation function, thereby obtaining a fully or semi-transformed text string, wherein the semi-transformed text string comprises a transformed portion and a plaintext portion; providing to a server the fully or semi-transformed text string, whereby the server is enabled to perform string-based analysis without being exposed to a content of the text string.

20 Claims, 11 Drawing Sheets

100
110
AGENT
115
110
AGENT
115
110
AGENT
115
110
AGENT
115
NETWORK
105
120

(56) References Cited

U.S. PATENT DOCUMENTS

2021/0042441 A1 2/2021 Webber
2021/0334455 A1* 10/2021 Gkoulalas-Divanis ...................... G06F 21/6254
2022/0019738 A1* 1/2022 Narulkar ............... G06F 40/232

* cited by examiner

PRIVACY-PRESERVING DATA COLLECTION

TECHNICAL FIELD

The present disclosure relates to accumulating information in general, and to systems, products, and methods for accumulating information while preserving user privacy, in particular.

BACKGROUND

Privacy regulations such as the General Data Protection Regulation (GDPR) of the European Union (EU), and the California Consumer Privacy Act (CCPA) have imposed meaningful limitations on the ability of corporations to perform commercial actions without violating privacy requirements.

A major concern dealt with by the privacy regulations is protecting sensitive information such as Personally Identifiable Information (PII). In many cases, sensitive information should not be transferred out of an end user's machine without receiving consent from the user, even when a server-side employs filtering techniques to eliminate any sensitive information at the server-side.

BRIEF SUMMARY

One exemplary embodiment of the disclosed subject matter is a method to be implemented at an end device, the method comprising: obtaining a graphical user interface (GUI) element of a GUI of the end device, wherein the GUI element is associated with a text string that is included in the GUI, wherein the text string comprises a first portion and a second portion; transforming the first portion of the text string according to a transformation function, wherein said transforming is not performed on the second portion of the text string, thereby obtaining a semi-transformed text string comprising a transformed portion and a plaintext portion; and providing to a server the semi-transformed text string, whereby the server is enabled to perform string-based analysis without being exposed to a content of the text string.

Optionally, the method comprises obtaining an element identifier of the GUI element, wherein the element identifier comprises the semi-transformed text string; locating, in the GUI, a second GUI element corresponding to the GUI element, wherein said locating comprises: performing a string-based search of elements of the GUI using the plaintext portion of the semi-transformed text string to determine a candidate element associated with a text string; transforming a portion of the text string associated with the candidate element according to the transformation function to obtain a transformed portion of the text string associated with the candidate element; and comparing the transformed portion of the text string associated with the candidate element with the transformed portion of the semi-transformed text string.

Optionally, the second portion may be one of: a suffix of the text string, a prefix of the text string, and an internal portion of the text string, wherein the second portion having a predetermined size.

Optionally, the method comprises defining a relative location of the second portion within the text string based on a count of candidate elements in the GUI that are associated with text strings corresponding to the second portion at a corresponding relative location.

Optionally, the method comprises defining a number of characters of the second portion based on a count of candidate elements in the GUI that are associated with text strings corresponding to the number of characters of the second portion.

Optionally, said providing comprises providing to the server a character count of the first portion, wherein the character count comprises a count of characters in the first portion.

Optionally, said transforming the first portion of the text string is performed in response to a determination that the text string is a potentially sensitive phrase.

Optionally, the determination that the text string is a potentially sensitive phrase is based on at least one of: the text string not being included in a whitelist indicating non-sensitive phrases; the text string being included in a blacklist indicating sensitive phrases; and an application of a classification rule determining whether an examined GUI element is associated with potentially sensitive content.

Optionally, the method comprises adding to a dictionary, in response to a determination that the text string is not a potentially sensitive phrase, the semi-transformed text string and the text string; and providing to the server the dictionary, whereby enabling the server to replace the semi-transformed text string with the text string.

Optionally, the server is configured to provide a display to an administrator user, wherein the display comprises information regarding a plurality of GUI elements including the GUI element and another GUI element, wherein the another GUI element is not included in the dictionary, wherein the display shows the text string associated with the GUI element and a semi-transformed text string associated with the another GUI element.

Optionally, the display is a display of the GUI with GUI elements wherein a portion of the plurality of GUI elements is associated with text strings that are semi-transformed, wherein the portion of the plurality of GUI elements comprises the another GUI element, wherein the server is configured to receive an indication from the administrator user that the semi-transformed text string associated with the another GUI element comprises non-sensitive content, wherein the method comprises adding untransformed content of the semi-transformed text string to the dictionary.

Optionally, the transformation function comprises a one-way hash function, a symmetric encryption function, an asymmetric encryption function, or the like.

Optionally, a different transformation function is used for different types of GUI elements.

Optionally, the method comprises selecting the transformation function for the text string; selecting a second transformation function for a second text string; transforming a first portion of the second text string according to the second transformation function, thereby obtaining a second semi-transformed text string comprising a transformed portion of the second text string and a plaintext portion of the second text string.

Optionally, the string-based analysis is a determination of an identifier useful for acquiring the GUI element, wherein the identifier is based on the semi-transformed text string.

Optionally, the GUI is at least one of: a website, a web-based application, a native mobile application, and a desktop application.

Another exemplary embodiment of the disclosed subject matter is a computer program product comprising a non-transitory computer readable storage medium retaining program instructions, which program instructions when read by a processor at an end device, cause the processor to perform: obtaining a GUI element of a GUI of the end device, wherein the GUI element is associated with a text string that is included in the GUI, wherein the text string comprises a first portion and a second portion; transforming the first portion of the text string according to a transformation function, wherein said transforming is not performed on the second portion of the text string, thereby obtaining a semi-transformed text string comprising a transformed portion and a plaintext portion; and providing to a server the semi-transformed text string, whereby the server is enabled to perform string-based analysis without being exposed to a content of the text string.

Yet another exemplary embodiment of the disclosed subject matter is a system at an end device, the system comprising a processor and coupled memory, the processor being adapted to perform: obtaining a GUI element of a GUI of the end device, wherein the GUI element is associated with a text string that is included in the GUI, wherein the text string comprises a first portion and a second portion; transforming the first portion of the text string according to a transformation function, wherein said transforming is not performed on the second portion of the text string, thereby obtaining a semi-transformed text string comprising a transformed portion and a plaintext portion; and providing to a server the semi-transformed text string, whereby the server is enabled to perform string-based analysis without being exposed to a content of the text string.

Yet another exemplary embodiment of the disclosed subject matter is a method to be implemented at an end device, the method comprising: obtaining an element identifier of a first GUI element, wherein the element identifier is associated with a semi-transformed text string, the semi-transformed text string comprising a transformed portion and a plaintext portion, wherein the semi-transformed text string is a result of a semi-transformation using a transformation function that is applied to a text string; and locating, in a GUI displayed at the end device, a second GUI element associated with the element identifier, wherein said locating comprises: performing a string-based search using the plaintext portion of the semi-transformed text string to determine a candidate element in the GUI; transforming a portion of a text string associated with the candidate element according to the transformation function to obtain a transformed portion of the text string associated with the candidate element; and comparing the transformed portion of the text string associated with the candidate element with the transformed portion of the semi-transformed text string.

Optionally, the method comprises determining that the transformed portion of the text string associated with the candidate element is identical to the transformed portion of the semi-transformed text string, whereby successfully locating the second GUI element using the element identifier.

Optionally, the element identifier comprises a character count of a portion of the text string that was transformed by the transformation function, wherein the character count comprises a count of characters of the portion prior to the semi-transformation, wherein said locating comprises utilizing the character count to determine the candidate element.

Optionally, the transformation function comprises a one-way hash function, a symmetric encryption function, an asymmetric encryption function, or the like.

Optionally, a different transformation function is used for different types of GUI elements.

Optionally, the GUI is at least one of: a website, a web-based application, a native mobile application, and a desktop application.

Yet another exemplary embodiment of the disclosed subject matter is a computer program product comprising a non-transitory computer readable storage medium retaining program instructions, which program instructions when read by a processor at an end device, cause the processor to perform: obtaining an element identifier of a first GUI element, wherein the element identifier is associated with a semi-transformed text string, the semi-transformed text string comprising a transformed portion and a plaintext portion, wherein the semi-transformed text string is a result of a semi-transformation using a transformation function that is applied to a text string; and locating, in a GUI displayed at the end device, a second GUI element associated with the element identifier, wherein said locating comprises: performing a string-based search using the plaintext portion of the semi-transformed text string to determine a candidate element in the GUI; transforming a portion of a text string associated with the candidate element according to the transformation function to obtain a transformed portion of the text string associated with the candidate element; and comparing the transformed portion of the text string associated with the candidate element with the transformed portion of the semi-transformed text string.

Yet another exemplary embodiment of the disclosed subject matter is a system at an end device, the system comprising a processor and coupled memory, the processor being adapted to perform: obtaining an element identifier of a first GUI element, wherein the element identifier is associated with a semi-transformed text string, the semi-transformed text string comprising a transformed portion and a plaintext portion, wherein the semi-transformed text string is a result of a semi-transformation using a transformation function that is applied to a text string; and locating, in a GUI displayed at the end device, a second GUI element associated with the element identifier, wherein said locating comprises: performing a string-based search using the plaintext portion of the semi-transformed text string to determine a candidate element in the GUI; transforming a portion of a text string associated with the candidate element according to the transformation function to obtain a transformed portion of the text string associated with the candidate element; and comparing the transformed portion of the text string associated with the candidate element with the transformed portion of the semi-transformed text string.

Yet another exemplary embodiment of the disclosed subject matter is a method comprising: obtaining a formatted document depicting at least a portion of a GUI of the end device, wherein the formatted document comprises a structure defining a plurality of sub-elements, wherein at least one sub-element is associated with a text string; performing a semi-transformation of the formatted document using a transformation function, thereby obtaining a semi-transformed formatted document, wherein the semi-transformed formatted document preserves the structure of the formatted document, wherein the semi-transformed formatted document comprises a transformed version of the text string, wherein the transformed version of the text string is transformed according to the transformation function; and providing to a second device the semi-transformed formatted document, whereby the second device is enabled to perform string-based analysis of the formatted document without being exposed to a content of the text string.

Optionally, the method comprises performing the semi-transformation comprises: identifying tokens and keywords in the formatted document, and avoiding from applying the transformation function on the tokens and keywords prior to said providing.

Optionally, the formatted document is defined in a markup language, wherein the formatted document comprises elements defined in the markup language with tags, wherein a first element of the formatted document comprises a content, wherein a second element of the formatted document comprises one or more pairs of attributes and corresponding attribute values, wherein said performing the semi-transformation comprises: selecting, from the formatted document, text strings to be transformed, wherein the text strings are selected from one or more text strings in the formatted document that are not used to define the tags or the attributes; and applying the transformation function on the text strings.

Optionally, said selecting the text strings comprises selecting, based on a determination that an attribute defines a sensitive attribute, a text string defining an attribute value of the attribute.

Optionally, the transformation function comprises a one-way hash function, a symmetric encryption function, an asymmetric encryption function, or the like.

Optionally, a different transformation function is used for different types of GUI elements.

Optionally, the GUI is at least one of: a website, a web-based application, a native mobile application, and a desktop application.

Yet another exemplary embodiment of the disclosed subject matter is a computer program product comprising a non-transitory computer readable storage medium retaining program instructions, which program instructions when read by a processor, cause the processor to perform: obtaining a formatted document depicting at least a portion of a GUI of the end device, wherein the formatted document comprises a structure defining a plurality of sub-elements, wherein at least one sub-element is associated with a text string; performing a semi-transformation of the formatted document using a transformation function, thereby obtaining a semi-transformed formatted document, wherein the semi-transformed formatted document preserves the structure of the formatted document, wherein the semi-transformed formatted document comprises a transformed version of the text string, wherein the transformed version of the text string is transformed according to the transformation function; and providing to a second device the semi-transformed formatted document, whereby the second device is enabled to perform string-based analysis of the formatted document without being exposed to a content of the text string.

Yet another exemplary embodiment of the disclosed subject matter is a system, the system comprising a processor and coupled memory, the processor being adapted to perform: obtaining a formatted document depicting at least a portion of a GUI of the end device, wherein the formatted document comprises a structure defining a plurality of sub-elements, wherein at least one sub-element is associated with a text string; performing a semi-transformation of the formatted document using a transformation function, thereby obtaining a semi-transformed formatted document, wherein the semi-transformed formatted document preserves the structure of the formatted document, wherein the semi-transformed formatted document comprises a transformed version of the text string, wherein the transformed version of the text string is transformed according to the transformation function; and providing to a second device the semi-transformed formatted document, whereby the second device is enabled to perform string-based analysis of the formatted document without being exposed to a content of the text string.

Yet another exemplary embodiment of the disclosed subject matter is a method comprising: obtaining an element identifier of a first GUI element that is associated with a transformed version of a text string, wherein the transformed version of the text string is a result of applying a transformation function to at least a portion of the text string; and locating, in a GUI that is presented by an end device, a second GUI element associated with the element identifier, wherein said locating comprises: executing a query of the element identifier to determine a candidate element in the GUI; transforming at least in part a text string associated with the candidate element according to the transformation function to obtain a transformed text string version associated with the candidate element; and comparing the transformed text string version associated with the candidate element, with the transformed version of the text string.

Optionally, a formatted document depicts at least a portion of the GUI, wherein the formatted document comprises a structure defining a plurality of sub-elements, wherein at least one sub-element in the formatted document is associated with the text string, wherein the end device comprising a rendering engine configured to render a display based on the formatted document, wherein the element identifier comprises the query, wherein said executing the query comprises querying the rendering engine to identify the candidate element in the formatted document.

Optionally, the element identifier is determined based on a semi-transformed formatted document, wherein the semi-transformed formatted document is obtained based on a semi-transformation of the formatted document using a transformation function, wherein the semi-transformed formatted document preserves the structure of the formatted document, wherein the semi-transformed formatted document is renderable by the rendering engine.

Optionally, the transformation function comprises a one-way hash function, a symmetric encryption function, an asymmetric encryption function, or the like.

Optionally, a different transformation function is used for different types of GUI elements.

Optionally, the GUI is at least one of: a website, a web-based application, a native mobile application, and a desktop application.

Yet another exemplary embodiment of the disclosed subject matter is a computer program product comprising a non-transitory computer readable storage medium retaining program instructions, which program instructions when read by a processor, cause the processor to perform: obtaining an element identifier of a first GUI element that is associated with a transformed version of a text string, wherein the transformed version of the text string is a result of applying a transformation function to at least a portion of the text string; and locating, in a GUI that is presented by an end device, a second GUI element associated with the element identifier, wherein said locating comprises: executing a query of the element identifier to determine a candidate element in the GUI; transforming at least in part a text string associated with the candidate element according to the transformation function to obtain a transformed text string version associated with the candidate element; and comparing the transformed text string version associated with the candidate element, with the transformed version of the text string.

Yet another exemplary embodiment of the disclosed subject matter is a system, the system comprising a processor and coupled memory, the processor being adapted to perform: obtaining an element identifier of a first GUI element that is associated with a transformed version of a text string, wherein the transformed version of the text string is a result of applying a transformation function to at least a portion of the text string; and locating, in a GUI that is presented by an end device, a second GUI element associated with the element identifier, wherein said locating comprises: executing a query of the element identifier to determine a candidate element in the GUI; transforming at least in part a text string associated with the candidate element according to the transformation function to obtain a transformed text string version associated with the candidate element; and comparing the transformed text string version associated with the candidate element, with the transformed version of the text string.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
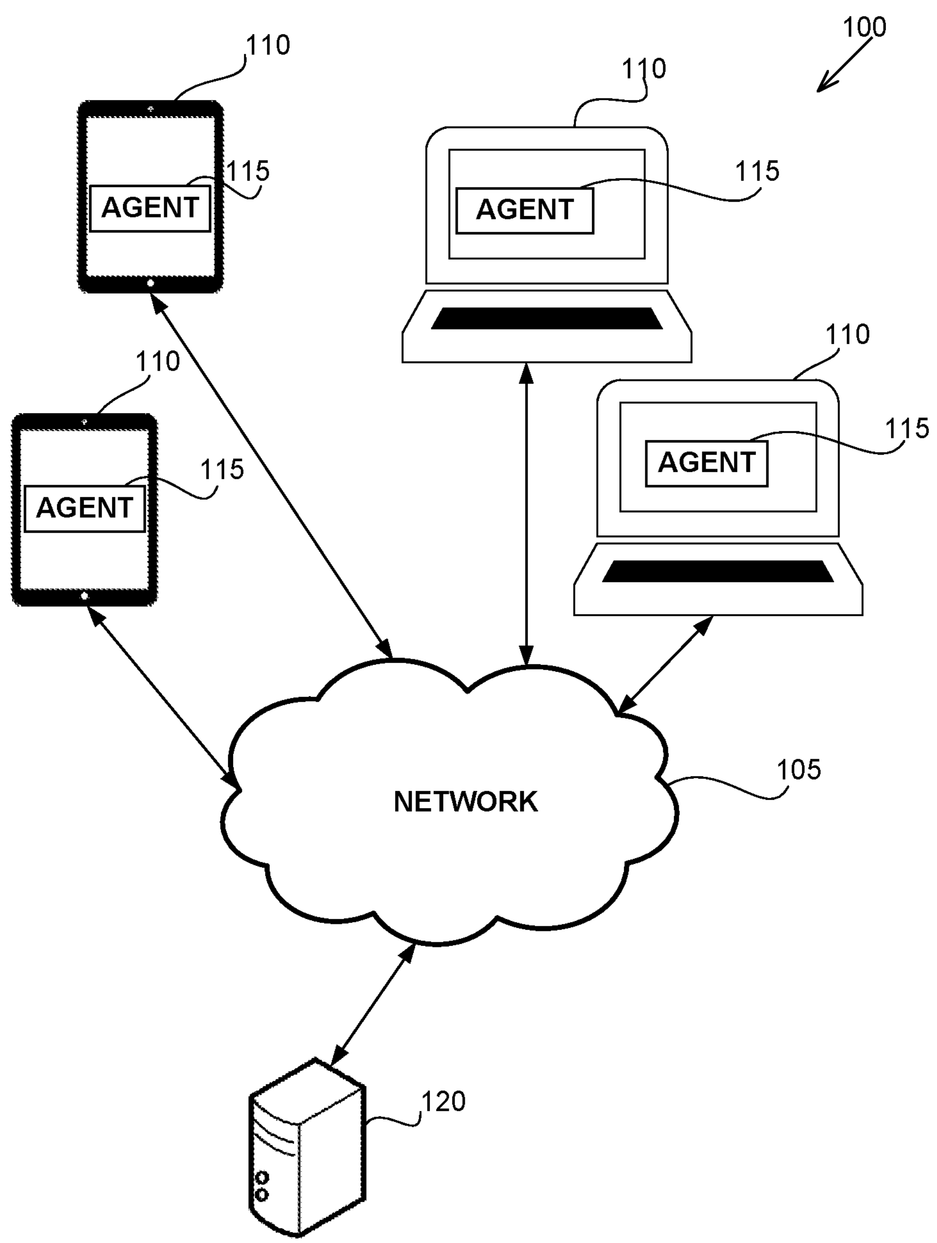
FIG. 1 illustrates a schematic illustration of an exemplary environment and architecture in which the disclosed subject matter may be utilized, in accordance with some exemplary embodiments of the disclosed subject matter.

One technical problem dealt with by the disclosed subject matter is accumulating potentially sensitive data from user devices, e.g., without violating privacy regulations. In some exemplary embodiments, as the data may comprise at least some sensitive information, it may be desired to enable privacy preserving collecting of data. In some exemplary embodiments, as part of a data collecting model, potentially sensitive information may be provided to a central server for analysis. Such information may comprise Personally Identifiable Information (PII), Protected Health Information (PHI), business sensitive data, or the like. For example, sensitive information may include the home location of the end-user, the user's comings and goings, information regarding health conditions, financial information, or the like. In some exemplary embodiments, uploading such data to a central server may violate different privacy rules and regulations such as the European Union (EU) General Data Protection Regulation (GDPR), the California Consumer Privacy Act (CCPA), or the like. It may be desired to protect privacy of users, as well as the manner of processing personal information, in a way that complies with such regulations. In some exemplary embodiments, third party entities which may provide a complementary service to the provider of the main service may also desire to process data. As an example, such third parties may provide monetization outlets (e.g. ad serving), augment information (e.g., providing mobility data or improving the User eXperience (UX), such as via the usage of digital adoption platforms), perform data analysis (e.g., data analytics services), or the like. The third parties may desire to obtain information from user devices and retain them at a server, e.g., while complying with privacy requirements. In some cases, it may be a requirement by their client, e.g., the service provider, that the third parties avoid collection PII and other sensitive information.

Another technical problem dealt with by the disclosed subject matter is to perform acquisition, in a privacy preserving manner. The acquisition may be based on unique or global identifiers of Graphical User Interface (GUI) elements that may be presented at end devices. In some exemplary embodiments, a GUI element may be a button, a label, a tooltip, a widget, an input field, a text box, or the like. In some exemplary embodiments, it may be desired to determine a global identifier of a GUI element that is displayed in an application, a webpage, or the like, e.g., possibly with slight changes in presentation of the GUI element at different end devices (also referred to as client devices, user devices, or the like). In some exemplary embodiments, determining global identifiers of GUI elements may allow to perform an analysis of the GUI elements such as usage analysis, statistics, or the like. For example, in order to identify usage statistics of a "search" text box in a certain application, the "search" text box needs to be identified. It may be desired to identify usage of the same "search" text box by a plurality of end devices using the certain application, e.g., a Google™ mobile application. The same "search" text box may appear in a slightly different manner at different end devices, e.g., due to different operation systems, types of devices, platforms, or the like. GUI acquisition is described in detail in U.S. Pat. No. 10,620,975, entitled "GUI Element Acquisition Using a Plurality of Alternative Representations of the GUI Element", which is hereby incorporated by reference in its entirety for all purposes without giving rise to disavowment. In some exemplary embodiments, globally identifying GUI elements over a plurality of end devices may enable execution of walkthroughs, gathering information for analytics, process automation, adding a display layer, augmenting functionality of the GUI, or the like. As an example, a walkthrough may be a tutorial which, when executed, presents, in a sequential manner, descriptive elements relating to the GUI, such as disclosed in U.S. Pat. No. 9,922,008, entitled "Calling Scripts Based Tutorials", which is hereby incorporated by reference in its entirety for all purposes without giving rise to disavowment. The descriptive elements may include instructions and/or examples of usage, and may be associated with respective GUI elements, such as a specific HyperText Markup Language (HTML) object within a web document.

A possible naïve solution to this problem may include performing full encryption (also referred to transformation or hashing) of a text string of a GUI element prior to sending the text string to the server in a manner that prevents the server from obtaining its content. In some exemplary embodiments, instead of transmitting the content of the webpage the user is viewing, each element thereof may be transformed and only the transformed version is transmitted. In some exemplary embodiments, transforming the entire text may on the one hand provide a high level of privacy, but on the other hand may have major disadvantages. As an example, the server may provide an identification manner that is based on the transferred value and not on the original one. As a result, in order to find an element and make use of the information for GUI acquisition purposes, the original version of the GUI, as is being presented at the client device, cannot be used. Instead, it may be required to iterate over all of the GUI elements in the GUI and calculate the transformation value for each one of them, in order to find the GUI element at the client device. This may result with performance issues, at least since calculating transformation values for each element may take a long time. In addition, when the GUI is an HTML-based application, such as web page, each screen may typically include thousands of elements such as <div> elements, requiring a substantive effort to transform all of them, both from the Central Processing Unit (CPU) and power usage perspectives.

Yet another technical problem dealt with by the disclosed subject matter is to locate GUI elements with a global identifier in end devices, e.g., without having full access to data of the end devices due to privacy restrictions. In some exemplary embodiments, privacy restrictions, such as imposed by regulations or other legislation, may require that sensitive data may not be transferred out of the end user's machine in the absent of explicit consent, which may not always be obtainable. In some exemplary embodiments, it may be desired to determine an identifier of a GUI element that may be used in order to locate the same GUI element in one or more end devices without having access to data of the end devices, which may be potentially sensitive. For example, a server may be configured to provide a walk-through that includes displaying certain instructions for a certain GUI element of a program such as a button element. The server may not have access to the GUI elements displayed at the end device, e.g., due to privacy restrictions, which may make it difficult to locate the desired button element and provide instructions thereto.

Yet another technical problem dealt with by the disclosed subject matter is to retain at a server accumulated information from users of user devices in a manner that ensures that the data cannot be used to violate the privacy of the users. In some exemplary embodiments, customers, end users, or the like, may not necessarily approve of sending sensitive information to the server, e.g., even when employing filtering of the data on the server side. In some exemplary embodiments, it may be desired to provide a system that complies with privacy regulations on the one hand and enables to retain data that is useful for advertising, walk-throughs, analysis, testing automation, navigation, or any other third-party applications, on the other hand.

One technical solution is to deploy an agent at an end device, that may be configured to encrypt a portion of data that is to be sent to a server, e.g., prior to sending the data. In some exemplary embodiments, the data to be sent may include text strings, attributes, images, or the like, (referred to as "text strings") associated with one or more GUI elements of a GUI displayed at the end device. In some exemplary embodiments, the GUI may include a GUI of a program executed by the end device, a screen, a form, a web document, an ANDROID™ layout, an iOS™ Swift™ playground object, or the like. In some exemplary embodiments, the program may include a website, a web-based application, a native mobile application, a desktop application, or the like. For example, the data to be sent may include a text string of a GUI element that was selected by the user, the entire GUI (e.g., a Document Object Model (DOM) file), DOM properties such as inner text or attribute text, a subset of the GUI, a specific element thereof, one or more types of GUI elements in the GUI, or the like. In some exemplary embodiments, text strings and images in the GUI may comprise sensitive information, such as Personally Identifiable Information (PII), Protected Health Information (PHI), business sensitive data, financial information, or any other type of sensitive data which may be private or sensitive to the user.

In some exemplary embodiments, the agent at the end device may semi-transform one or more text strings of the GUI that are determined to be sent to the server. In some exemplary embodiments, instead of transforming entire text strings, only a portion of each text string may be transformed. In some exemplary embodiments, the partial transformation may be useful in overcoming the disadvantages of transforming the entire text string such as performance issues. In some exemplary embodiments, semi-transforming a text string may be performed by leaving a few characters in an original non-transformed version that may remain in plaintext. In some exemplary embodiments, the remaining characters of the text string that are not left in plaintext may be transformed, e.g., to preserve the user's privacy. In some exemplary embodiments, the plaintext part may contain a relatively small number of letters such as one, two, three, four, or the like, which guarantees the text string does not contain sensitive information that violate the user's privacy. For example, a plaintext length of ten characters may violate a user's privacy, as it may be sufficient to include PII information or other substrings that are sensitive to the user and which may be left in plaintext.

In some exemplary embodiments, prior to providing a text string to the server, the agent may transform a first portion of the text string according a transformation function such as a one-way hash function, an encryption function, or any other encryption technique, that may not enable third parties such as the server to restore content of the data that is sent. In some exemplary embodiments, the transformation function may not be applied to a second portion of the text string, which may remain unencrypted, e.g., in plaintext. In some exemplary embodiments, the second portion including the plaintext characters that are not hashed may be defined as the prefix of the text string, the suffix of the text string, or a middle portion of the text string. For example: "Submit" may be hashed in part as "<u>Su</u>5Fd3fds", "Xf3gd<u>bm</u>FDS432", "FDSF34<u>it</u>", or the like. In this example, the underline text is the plaintext portion. In some exemplary embodiments, the second portion may have a predetermined length, size, number of characters, or the like, e.g., which may be agreed upon between the server and one or more end devices prior to uploading data to the server. In some exemplary embodiments, an administrator user may set the properties of the first portion, such as relative location, size, or the like. In some exemplary embodiments, different properties may be applied to types of strings. As an example in an "href" attribute, the first portion may be after the first 8 characters (accounting for https:// or http:// prefix) and having a relatively large size (e.g., 8 characters) as most domain names consume at least 6 characters and are not PII on their own). In contrast, a string in a "value" attribute in an "input" tag may be considered potentially more confidential, and only the first 2 characters may be preserved as part of the first portion.

In some exemplary embodiments, by transforming the first portion and not transforming the second portion, the agent may obtain a semi-transformed text string (also referred to as "encrypted-in-part data") comprising a transformed portion, e.g., a transformed version of the first portion, and a plaintext portion, e.g., an original version of the second portion. In some exemplary embodiments, the semi-transformed text string may be provided to a server, a third-party device, or any other apparatus. In some exemplary embodiments, sending to the server encrypted-in-part data may ensure that the obtained data at the server does not contain sensitive data, as its content is encrypted in part and cannot be restored by third parties. In some exemplary embodiments, a server receiving the semi-transformed text string may perform string-based analysis without being exposed to a content of the obtained text strings, e.g., as the content may be encrypted-in-part. For example, the server may generate a walkthrough that may identify a GUI element based on an encrypted-in-part text string of the GUI element, a location of the text string of the GUI element, neighbors of the GUI element, or the like, without being exposed to the full content of the text string. In some exemplary embodiments, for a one-way transformation function, the server may obtain the transformation function without being able to restore content that was encrypted using the transformation function. In some exemplary embodiments, the intended functionality of the server may comprise walkthroughs, analytics such as user behavior analytics, session recording, automation, quality assurance automation, security purposes, or the like.

In some exemplary embodiments, in order to increase a usefulness of the encrypted-in-part data for the server, the agent may identify one or more non-sensitive information at the end device and provide the non-sensitive information to the server in a manner that enables to server to restore or identify a content of the non-sensitive information. For example, in order to provide translations of phrases, the server may need to obtain the phrases in plaintext.

In some exemplary embodiments, the first portion of the text string may be transformed in response to a determination that the text string is a potentially sensitive phrase. Otherwise, the first portion may not be transformed, and the entire text string may be provided to the server in plaintext. In some exemplary embodiments, the text string may be determined as being a potentially sensitive phrase based on the text string not being included in a whitelist indicating non-sensitive phrases, based on the text string being included in a blacklist indicating sensitive phrases, based on a determination by a machine-learning-based predictor, based on an application of a classification rule, e.g., indicating whether an examined GUI element comprises or is associated with potentially sensitive content, or the like. In some exemplary embodiments, in case the text string is not identified as potentially sensitive, or is identified as being non-sensitive, the first portion may not be transformed prior to being submitted to the server.

In some exemplary embodiments, the agent may identify potentially sensitive phrases and semi-transform all the provided data, including non-sensitive information that was identified as non-sensitive. In some exemplary embodiments, the agent may provide the server with a dictionary that may enable to convert or replace semi-transformed text strings to their plaintext version, in case the semi-transformed text strings are non-sensitive. In some exemplary embodiments, a text string may be determined as being a non-sensitive text string based on the text string being included in a whitelist indicating non-sensitive phrases, based on the text string not being included in a blacklist indicating sensitive phrases, based on a determination by a machine-learning-based predictor, based on an application of a classification rule determining whether an examined GUI element comprises potentially sensitive content, e.g., indicating that the text string is not sensitive, based on a human operator such as an administrator user indicating that a semi-transformed text string is not sensitive, or the like. In some exemplary embodiments, in response to a determination that the text string is not a sensitive phrase, the text string may be added to a dictionary in plaintext, along with the semi-transformed version of the text string, e.g., in a same entry of the dictionary. In some exemplary embodiments, the dictionary may be provided to the server, e.g., to enable the server to replace the semi-transformed text string with the text string and thus restore a content of the text string.

Another technical solution is to deploy an agent at an end device, e.g., in order to perform semi-transformation of formatted documents. In some exemplary embodiments, the agent may be configured to encrypt a portion of a formatted document, which may have content or a representation that is to be sent to a server. In some exemplary embodiments, semi-transformation of the formatted document may be performed. In some exemplary embodiments, the formatted document may depict a GUI of an end device or a portion thereof. In some exemplary embodiments, the GUI of the end device may include a GUI of a program executed by the end device, a screen, a form, a web document, an ANDROID™ layout, an iOS™ Swift™ playground object, or the like. In some exemplary embodiments, the formatted document or content thereof may be obtained by the agent.

In some exemplary embodiments, the formatted document may include a structure, a format, a form, a layout, or the like, which may define a plurality of sub-elements, locations thereof, or the like, within the formatted document. In some exemplary embodiments, the plurality of sub-elements may comprise GUI elements, associated text strings, structure elements, graphical elements, hidden tags or marks, or the like. In some exemplary embodiments, at least one sub-element, e.g., a GUI element, defined by the structure may comprise at least one text string. For example, the text string may be a visible or hidden text string that is associated to the GUI element in the formatted document.

In some exemplary embodiments, the agent at the end device may semi-transform the formatted document. In some exemplary embodiments, instead of transforming the entire formatted document, only a portion of the formatted document may be transformed. In some exemplary embodiments, the semi-transformation may utilize a transformation function, which may be applied to one or more portions, sub-elements, or the like, of the formatted document, while not being applied to one or more remaining portions. In some exemplary embodiments, the transformation function may include a one-way hash function, an encryption function, or any other encryption technique, that may not enable receiving parties such as the server to restore content of data that is sent in a transformed manner. In some exemplary embodiments, the semi-transformation may enable to obtain a semi-transformed formatted document, including one or more transformed elements and one or more untransformed elements.

In some exemplary embodiments, the transformation function may be applied to a first portion of the formatted document, such as a text portion or portion thereof, and not to a second portion of the formatted document, such as a portion that forms a part of the structure of the formatted document, e.g., a token, a keyword, or the like. In some exemplary embodiments, the semi-transformed formatted document may preserve the structure of the formatted document, the layout of the formatted document, or any other area of the formatted document that is not considered sensitive, by not transforming these portions. In some exemplary embodiments, the semi-transformed formatted document may not preserve sensitive information, text strings, or any other element of the formatted document, by transforming these portions partially or fully. In some exemplary embodiments, the agent may determine whether text strings contain sensitive data based on one or more rules, user indications, indications of blacklists or whitelists, heuristics, classifiers, or the like. In some cases, the semi-transformed formatted document may comprise a transformed version of one or more text strings of the plurality of sub-elements, e.g., including the at least one text string of the at least one sub-element. In this case, the transformed version of the text string may be transformed according to the transformation function.

In some exemplary embodiments, the semi-transformation may transform some text strings in the formatted document, while not transforming others. In some exemplary embodiments, performing the semi-transformation may comprise selecting, from the formatted document, text strings to be transformed, while not transforming unselected text strings. In some exemplary embodiments, the transformation function may be applied on the selected text strings, and not on the unselected text strings.

In some exemplary embodiments, any element of the formatted document that is required for rendering the formatted document by a rendering engine, may be preserved and may not be transformed. In some exemplary embodiments, text strings that define compilation elements such as a syntax element of a markup language, a token of a markup language, elements that are required for a lexical analysis, reserved keywords, elements that are required for a syntax analysis such as for scanning or parsing, elements that are required for a semantic analysis, or the like, may not be transformed. In some exemplary embodiments, tags, attributes, or any other structural or non-sensitive text strings in the formatted document may not be selected to be transformed.

In some exemplary embodiments, text strings that are not compilation elements such as text strings that are inserted between tags, text strings that define values of attributes, or the like, may or may not be transformed, e.g., based on whether or not they are determined to comprise potentially sensitive information. In some exemplary embodiments, the text strings may be selected based on a determination that an attribute defines a sensitive attribute, and that a text string of the attribute defines an attribute value of the attribute. In such cases, the attribute may be preserved, while the attribute value may or may not be transformed, e.g., based on whether it may be potentially sensitive.

In some exemplary embodiments, the formatted document may be defined in a language such as a markup language, which may comprise elements defined with tags, marks, or the like. In other cases, the formatted document may be defined in any other language or form. In some exemplary embodiments, a first element of the markup language may comprise a content, while a second element the markup language may comprise one or more pairs of attributes and corresponding attribute values. In some exemplary embodiments, the first element may be semi-transformed or fully transformed, while the second element may be preserved, e.g., since it may not be sensitive.

In some exemplary embodiments, performing the semi-transformation may comprise identifying tokens, keywords, structure elements, or the like, in the formatted document, and avoiding from applying the transformation function on them. In some exemplary embodiments, performing the semi-transformation may comprise identifying static elements that are not content-based and therefore not sensitive, and preserving these elements without transforming them. In some exemplary embodiments, performing the semi-transformation may comprise identifying tags or attributes that do not define potentially sensitive content, and preserving the tags or attributes along with their content.

As an example, considering a GUI implemented using HTML, certain attributes of a tag or a mark may be considered potentially sensitive (e.g., user-provided input, displayed string, Uniform Resource Locators (URLs), or the like), while others may be considered as non-sensitive by nature (e.g., color attribute of an element, a height attribute of an element, a border attribute, or the like). For example, the formatted document may comprise an HTML element that is defined by a paragraph attribute pair such as <p>This is a paragraph.</p>. According to this example, the <p> tag may be persevered without being transformed, while the text within the attribute pair, e.g., “This is a paragraph”, may be transformed at least in part. As another example, an HTML attribute of type <style> may be defined as a non-sensitive attribute, and it may be preserved along with its content. As another example, HTML code stating <img src=“example.gif” alt=“Example” width=“200” height=“100”>, may be analyzed. The keywords img, src, alt, width, height, as well as the tokens ‘<’, ‘>’, ‘=’, ‘"’ may be preserved. Additionally or alternatively, the content of some attributes may be determined to be non-sensitive by nature, such the value of the width attribute, the value of the height attribute, or the like. Potentially sensitive content, such as the value of the src attribute (the source of the image itself) as well as the alternative text defined in the alt attribute, may be transformed, either in whole or in part.

In some exemplary embodiments, indications or test strings of the semi-transformed formatted document may be provided to a second device, e.g., a server, or any other device. In some exemplary embodiments, the second device may be enabled to perform analysis, e.g., string-based analysis, of the formatted document without being exposed to a content of sensitive information, e.g., since the content may be at least partially transformed.

Yet another technical solution is to obtain at an end device an element identifier of a first GUI element, e.g., from a server. In some exemplary embodiments, the element identifier may be configured to globally identify a GUI element in a GUI, a screen, a display, or the like, which may be utilized in any of a plurality of end devices. In some exemplary embodiments, the element identifier may comprise or correspond to a semi-transformed text string which may include a text string that was semi-transformed according to a transformation function, e.g., at a different end device, or at the same end device. In some exemplary embodiments, the text string may be semi-transformed by transforming a first portion of the text string and not transforming a second portion of the text string. In some exemplary embodiments, the semi-transformed text string may comprise a transformed portion, e.g., corresponding to a transformed version of the first portion, and a plaintext portion, e.g., corresponding to the second portion of the text string. In some exemplary embodiments, one or more end devices of the plurality of end devices may locate, in their GUI, screen, display, or the like, one or more second GUI elements that corresponds to the semi-transformed text string. In some exemplary embodiments, along with the element identifier, the server may provide a character count, character length, or the like, of the first portion of the text string, e.g., prior to being transformed to the transformed portion.

In some exemplary embodiments, an agent deployed at the end device may locate, e.g., in a GUI of the end device, a second GUI element associated with the element identifier. In some exemplary embodiments, the second GUI element may be located by performing a string-based search of GUI elements in the GUI of the end device, e.g., based on the element identifier. In some exemplary embodiments, the string-based search may include using the plaintext portion of the semi-transformed text string to determine or identify one or more candidate elements in the GUI of the end device that are associated with respective text strings that include the same plaintext portion, e.g., at a same relative location in the text string. In some exemplary embodiments, each candidate element may be associated with at least one text string. In some exemplary embodiments, a remaining portion of a text string of each candidate element may be transformed according to the transformation function, e.g., the same transformation function that was used to transform the text string earlier at a different end device or at the same end device. In some exemplary embodiments, a transformed portion of a text string of a candidate element that was transformed according to the transformation function may be compared to the transformed portion of the semi-transformed text string in the element identifier, e.g., to identify whether they are identical. In case they are identical, the agent may determine that the first and second GUI elements have the same element identifier, thus successfully locating the second GUI element in the GUI.

In some exemplary embodiments, the element identifier may be utilized to provide one or more useful functionalities, e.g., based on a cooperation between one or more agents of end devices with the server. In some cases, using the element identifier, the server may request from an agent to perform one or more queries using the element identifier. For example, the server may request to perform a word count of a selected word in a mobile application, and the agent may perform a query using the element identifier of the word to provide a solution to the server. In some cases, using the element identifier, the server may request from a plurality of agents of a respective plurality of end devices to provide usage information associated with a GUI element that is indicated by the element identifier. For example, the server may request each agent to accumulate information regarding a number of times that a user of the corresponding device has selected an element of the element identifier. Each agent may utilize the element identifier to identify such occurrences over a timeframe, calculate a total number of occurrences over the timeframe, and report the number. The server may obtain from each agent the usage statistics and perform an analysis based on the statistics.

In some exemplary embodiments, the element identifier may comprise a query associated with a semi-transformed text string. In some exemplary embodiments, the one or more end devices may locate the GUI element by applying the query associated with the semi-transformed text string on the GUI. As an example, the one or more end devices may execute a same mobile application, e.g., a Waze™ application, having a same GUI element which may be located or presented in a slightly different manner in different devices, e.g., due to different platforms, operating systems, network connectivity status, available bandwidth, or the like. In some exemplary embodiments, the one or more end devices may receive from the server a query that globally identifies a certain element in the mobile application, e.g., globally over all the one or more end devices. Thus, the element identifier may identify in each end device a same GUI element that might have slight variations, e.g., to provide thereto a walkthrough or any other functionality. In some exemplary embodiments, the element identifier may be provided by the server as part of a request such as a request to obtain statistics of usage of the second GUI element at the end device, a request to obtain a count of the text string at the end device, or the like. In some exemplary embodiments, the second GUI element may be located in the GUI in response to a request and requested statistics of the second GUI element may be accumulated. In some exemplary embodiments, the query may be determined by a machine learning classifier which may be deployed at the server, by one or more rules, heuristics, or the like, and may include any query that globally locates a same GUI element over different end devices. In some exemplary embodiments, the query may be based on a semi-transformed content of a text string, on a location of the text string, on neighbors of the text string, or the like.

In some exemplary embodiments, the query may include a string-based search that may be performed using the plaintext portion of the semi-transformed text string to determine at least one candidate element in each end device having an associated text string with the plaintext portion, e.g., in the correct relative location within the text string which may be indicated by the query, such as using regular expressions. In some exemplary embodiments, candidate elements may further be filtered according to the character length of the remaining portion of the associated text strings, e.g., which may be provided by the server. For example, text strings of candidate elements that have an incorrect character length, e.g., a length that does not match the semi-transformed text string, may be discarded. In some exemplary embodiments, a remaining portion of a candidate element's text string, after excluding the plaintext portion, may be transformed according to the transformation function to obtain a transformed portion of the candidate element's text string. In some exemplary embodiments, the transformed portion of the candidate element's text string may be compared with the transformed portion of the semi-transformed text string, e.g., to identify whether they are identical.

Yet another technical solution is to obtain at one or more end devices an element identifier of a first GUI element, e.g., from a server, or from any other source. In some exemplary embodiments, the element identifier may be configured to globally identify a GUI element, e.g., the first GUI element, in a GUI, a screen, a display, or the like, which may be utilized in any of a plurality of end devices. In some exemplary embodiments, the one or more end devices may locate, in their GUI, screen, display, or the like, one or more second GUI elements that correspond to the element identifier. In some exemplary embodiments, the element identifier may identify in each end device a same GUI element that might have slight variations, e.g., to provide a robust acquisition of the GUI element for applications such as analytics, GUI augmentation, or the like. In some exemplary embodiments, variations may occur due to different operating systems, software platforms, configuration, or the like. Additionally, or alternatively, variations may occur due to updates of the underlying software, obfuscation, or the like, or due to any other situation or scenario.

In some exemplary embodiments, the element identifier of the first GUI element may be associated with a transformed version of a text string. In some exemplary embodiments, the transformed version of the text string may be a result of applying a transformation function to at least a portion of the text string, e.g., at a same end device that obtained the element identifier, or at a different end device. In some exemplary embodiments, the text string may be depicted in or associated with a formatted document. In some exemplary embodiments, the formatted document may depict at least a portion of the GUI of the end device that obtained the element identifier, a similar GUI of the same program, or the like. In some exemplary embodiments, the formatted document may comprise a structure defining a plurality of sub-elements. In some exemplary embodiments, at least one sub-element in the formatted document may comprise a GUI element, e.g., the first GUI element, which may be associated with the text string.

In some exemplary embodiments, an agent deployed at the end device may locate, e.g., in a GUI of the end device, a second GUI element associated with the element identifier. In some exemplary embodiments, the element identifier may comprise a query. In some exemplary embodiments, locating the second GUI element may comprise executing the query of the element identifier to determine a candidate element in the GUI. In some exemplary embodiments, the end device may comprise a rendering engine configured to render a display based on the formatted document. In some exemplary embodiments, executing the query may comprise querying the rendering engine with the query in order to identify candidate elements in the formatted document. In some exemplary embodiments, the rendering engine may be configured to render the display based on one or more structural or non-sensitive elements or portions of the formatted document, which may be utilized by the query.

In some exemplary embodiments, upon identifying one or more candidate elements resulting from the query, a text string associated with each candidate element may be transformed at least in part according to the transformation function, e.g., in order to obtain a transformed version of the text string associated with each candidate element. In some exemplary embodiments, the transformed versions associated with the candidate elements may be compared with the transformed version associated with the text string of the first GUI element. In case they are identical, the agent may determine that the first and second GUI elements have the same element identifier, thus successfully locating the second GUI element in the GUI. Alternatively, the agent may determine that the GUI element represented by the element identifier was not located.

In some exemplary embodiments, the query may include a search that may be performed using structural or non-sensitive elements associated with the text string of the first GUI element to determine at least one candidate element in each end device, e.g., each having an associated text string. For example, the query may define a relative location within the formatted document which may be associated with the text string of the first GUI element, such as using regular expressions. As another example, the query may define a type of attribute or tag of the first GUI element. As yet another example, the query may utilize similar properties to identify another GUI element, which may be used to identify the first GUI element, such as an element containing the first GUI element, an element that is adjacent the first GUI element, or the like.

In some exemplary embodiments, along with the element identifier, the server may provide the one or more end devices with a character count, character length, or the like, of the text string of the first GUI element, e.g., in its original version prior to being transformed. In some exemplary embodiments, in case only a portion of the text string of the first GUI element was transformed, the character count may only relate to the portion of the text string that was transformed. Additionally, or alternatively, the character count may relate to the entire string. In some exemplary embodiments, the character count may be used to filter candidate elements prior to performing transformations of text strings associated with each candidate element.

For example, a text string of "hello" may be transformed to a transformed text string "76r5ve56uV&g57e". Accordingly, the character count that is provided along with the element identifier may include the value of 5, e.g., the character count of "hello". In some cases, the character count of the transformed text string may be larger than the character count of the untransformed text string. In other cases, the character count of the transformed text string may be equal to the character count of the untransformed text string, or smaller.

In some exemplary embodiments, the element identifier may be determined based on a semi-transformed version of the formatted document, e.g., referred to as a semi-transformed formatted document. In some exemplary embodiments, the semi-transformed formatted document may be obtained based on a semi-transformation of the formatted document, e.g., using the transformation function. In some exemplary embodiments, the semi-transformed formatted document may preserve the structure of the formatted document, including any compilation element that is needed for rendering of the formatted document, such as tags, attributes, or the like. In some exemplary embodiments, by preserving the structure of the formatted document, an abstract syntax tree created while parsing the original formatted document and the abstract syntax tree created while parsing the semi-transformed formatted document are of identical structure, with potentially different content in one or more nodes. In some exemplary embodiments, the semi-transformed formatted document may be renderable by the rendering engine of the end device, and may adhere to all parsing rules in the same manner that the formatted document adheres to such rules.

It is noted that the disclosed subject matter may be implemented in systems where data is collected from end-devices and processed without necessarily provisioning the outcome of such processing to the end-devices. As an example, in one embodiment, statistical data is gathered over time and insights may be derived therefrom. In some cases, a session of a user can be tracked to view how she interacted with the system. When the information is displayed to an administrator user, such as using an administrator dashboard, the semi-transformed text strings may be utilized to provide a display to the administrator user, enabling him to comprehend the activity of the user, without divulging PII and other private information the user may have entered or viewed, such as her name, address, balance in the account, or the like. For the sake of clarity of the disclosure, the present disclosure focuses on the embodiment in which the GUI-based data is used to obtain an identifier useful for GUI acquisition. However, the disclosed subject matter is not limited to such embodiment and any processing may be performed.

One technical effect of utilizing the disclosed subject matter is enabling the server to achieve its intended functionality without obtaining a content of sensitive information from end users, thus eliminating the need to obtain special consent from customers prior to accumulating information from their devices.

Another technical effect of utilizing the disclosed subject matter retaining accumulated data from user devices without any sensitive information coming out of the user devices. In some exemplary embodiments, the disclosed subject matter may enable entities such as advertising parties, providers of digital adoption platforms, or the like, to obtain information from user devices and retain them at a server, e.g., while complying with privacy requirements.

Yet another technical effect of utilizing the disclosed subject matter is provisioning of a resource-efficient solution to providing private data. The disclosed subject matter enables a server or any other third-party to obtain semi-transformed text strings and define rules based thereon. The rules may be applied on end-devices, where the non-transformed strings are available. The disclosed subject matter enables utilization of text-based queries to reduce the number of potential candidates that need to be transformed, thereby preserving CPU resources and power resources, and while enabling quick resolution and application of the rules without causing a delay that would adversely affect the user experience.

Yet another technical effect of utilizing the disclosed subject matter is a privacy preserving acquisition of a GUI element. The disclosed subject matter enables to acquire, in a privacy preserving manner, GUI elements of one or more programs. Specifically, the disclosed subject matter enables determination of global identifiers of GUI elements allowing to identify the GUI elements over a plurality of end devices and enabling to analyze the GUI elements in a privacy preserving manner. In some exemplary embodiments, globally identifying GUI elements may enable execution of useful processes such as walkthroughs, providing an augmented display over the GUI, gathering information for analytics, analyzing the actions of the user or users, executing testing automation, process automation, augmenting functionality of the GUI, or the like.

Yet another technical effect of utilizing the disclosed subject matter is locating a GUI element in the GUI based on semi-transformed data alone. In some exemplary embodiments, the disclosed subject matter enables to provide an identifier of a GUI element that may be used in order to locate the same GUI element, e.g., possibly with slight changes, in one or more end devices without obtaining a full content of the text string of the GUI element. In some exemplary embodiments, the disclosed subject matter may be useful for any algorithm configured for finding elements that relies on text or attributes.

Yet another technical effect of utilizing the disclosed subject matter is enhancing a user experience of executing a GUI of a program, such as by augmenting functionality thereof, providing adaptable walkthroughs thereto, adding display layer over the GUI, collecting usage statistics, or the like, without violating privacy regulations and without necessarily receiving access or communicating with programs that are being executed on the end devices.

The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIG. 1 showing an environment, in accordance with some exemplary embodiments of the disclosed subject matter.

Environment 100 may comprise a plurality of Client Devices 110. Client Devices 110 may by Personal Computers (PCs), tablets, smartphones, or the like. Client Devices 110 may be connected to a Computerized Network 105, such as a Wide Area Network (WAN), a Local Area Network (LAN), a wireless network, the Internet, an intranet, or the like.

In some exemplary embodiments, an Agent 115 may be running on a Client Device 110. In some exemplary embodiments, each Client Device 110 may execute a corresponding Agent 115. Additionally, or alternatively, only a portion of Client Devices 110 may execute an Agent 115. Agent 115 may be a program product executable by a computer, such as, without limitations, a script, a crawler, a software, a browser extension, a mobile application, a web application, a Software Development Kit (SDK), a shared library, a Dynamic Link Library (DLL), or the like.

Client Device 110 may be configured to execute a program having a GUI. The program may be, for example, a web page, a web application, a browser extension, a mobile application, desktop application, or the like. The program may display to an end-user one or more screens, constituting the GUI, which comprise GUI elements.

In some exemplary embodiments, Agent 115 may be configured to obtain at least one GUI element appearing in the GUI. In some exemplary embodiments, Agent 115 may obtain a digital representation of the displayed GUI, such as an HTML document, a screen capture image, eXtensible Markup Language (XML) document representing the elements of the GUI and their properties, a Document Object Module (DOM) file, ANDROID™ layout, or any other digital representation of the GUI. For example, Agent 115 may obtain a specific interactive button, a text element, a tool tip, or the like in a program executed by Client Device 110.

Environment 100 may comprise Server 120, which may be connected to Computerized Network 105. Server 120 may be a remote server, a cloud server, a Domain Name System (DNS), a Gateway (GW) server, a virtual private network (VPN) server, or the like. In some exemplary embodiments, Server 120 may be configured to accumulate information from Agents 115, track user activity with respect to a program, monitor usage statistics relating to GUI elements, determine element identifiers of GUI elements, or the like. In some exemplary embodiments, Agents 115 may be configured to transmit to Server 120 text strings of GUIs or elements thereof encountered by Agents 115. In some exemplary embodiments, Agents 115 may be configured to transmit to Server 120 semi-transformed formatted documents or representations thereof. In some exemplary embodiments, text strings of encountered GUIs may be transmitted to Server 120 in a semi-transformed manner or in a fully transformed manner. Alternatively, in case the text strings are identified by Agents 115 as non-sensitive, they may be transmitted to Server 120 in a plaintext version, or along with a dictionary including the plaintext version. It is noted that Agent 115 may transmit to Server 120 the entire digital representation of the GUI, e.g., a DOM file, an HTML file, or the like. Such digital representation may be processed, and each potentially sensitive string may be at least semi-transformed. As an example, considering a GUI implemented using HTML, certain attributes of a tag may be considered potentially sensitive (e.g., user-provided input, displayed string, content of a tooltip, URLs, or the like), while others may be considered as non-sensitive by nature (e.g., color attribute of an element, a height attribute of an element, a border attribute, or the like). In some exemplary embodiments, compilation elements, such as tokens, keywords, or the like, that are necessary for rendering the GUI, may not be considered sensitive and therefore may not be transformed.

In some exemplary embodiments, Server 120 may acquire the semi-transformed or fully transformed text strings and the plaintext text strings from Agents 115 and retain them along with corresponding identifiers such as their locations, their context, their neighbors, or the like. In some cases, Server 120 may determine element identifiers that can locate a GUI element over a plurality of Client Devices 110 based on the semi-transformed text strings and possibly using additional context information. In some cases, Server 120 may determine element identifiers that can locate a GUI element over a plurality of Client Devices 110 based on fully transformed text strings, e.g., using additional context information such as a relative location, a structure, or the like. In some exemplary embodiments, Server 120 may generate an element identifier to include a query that searches for a semi-transformed or fully transformed text string, for a context of the text string, or the like. In some exemplary embodiments, the query that searches for the semi-transformed text string may be based on the plaintext part of the semi-transformed text string. In some exemplary embodiments, the query that searches for the fully transformed text string may be based on structural elements of the text string, e.g., a type of attribute, a relative location, or the like. In some exemplary embodiments, Server 120 may attempt to locate a GUI element in Client Devices 110 by sending Agents 115 an element identifier of the GUI element, which may include a query that finds the GUI element. In some exemplary embodiments, in response to an Agent 115 attempting to acquire an element, one or more element candidates may be identified that are a result of applying the query. In some exemplary embodiments, the query may be configured to apply the semi-transformation or full transformation on the candidates' text strings and locate the target semi-transformed text string between the candidates' text strings.

In some exemplary embodiments, Server 120 may locate GUI elements in order to perform analyses, provide a walkthrough, determine statistics, or the like. In some cases, Agent 115 may implement a walkthrough, e.g., obtained from Server 120, in which elements of the walkthrough may be displayed in a location adjacent to located GUI elements, which may be located using the element identifier. In other cases, Agent 115 may implement any other functionality.

As an example, an Agent 115 of a first Client Device 110 may obtain a first GUI element with a text string "apply" in a program GUI such as a form of a tax program, and apply a transformation function on at least a portion the text string to obtained a transformed version of the text string prior to providing it to Server 120. In some exemplary embodiments, Server 120 may determine an element identifier of the transformed version of the "apply" text string and utilize the element identifier to identify the "apply" text string in the form of the tax program at a second Client Device 110. In some exemplary embodiments, this may enable Server 120, for example, to count a number of times that each user of a Client Device 110 presses the first GUI element. For example, Server 120 may instruct all Agents 115 of Client Devices 110 to count a number of clicks on an element identified by the element identifier such as the "apply" text string.

Figure 2:
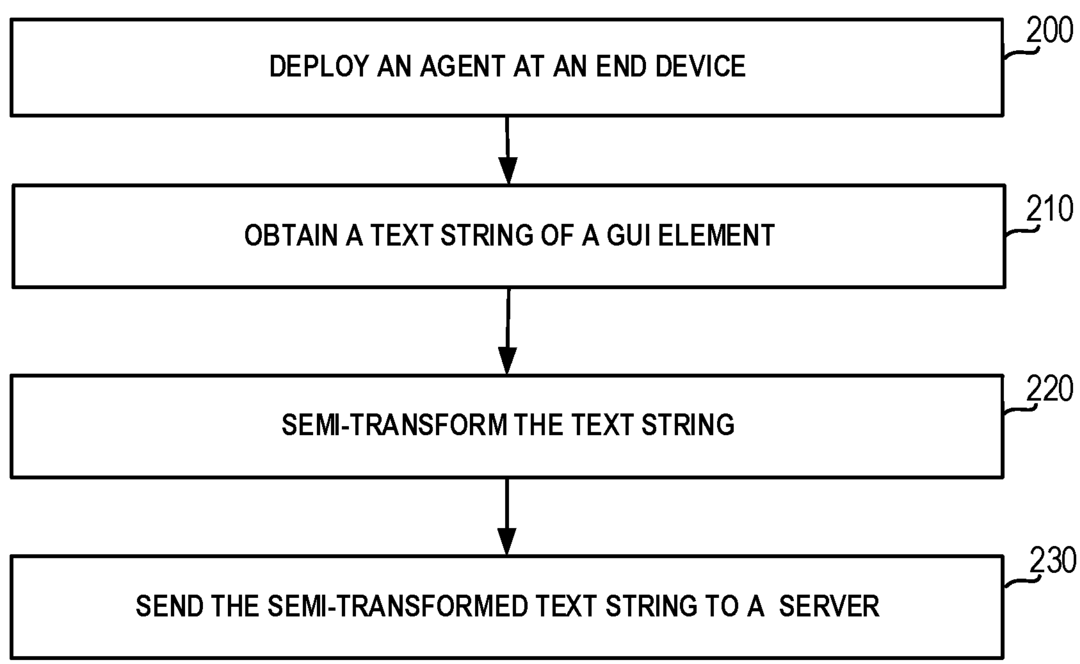
FIG. 2 illustrates a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 200, an agent may be deployed at an end device of a user. In some exemplary embodiments, while deploying the agent, the end device may execute one or more programs, e.g., mobile programs, desktop programs, web programs, or the like. In some exemplary embodiments, the agent may comprise one or more crawlers, scripts, software products, user-operated clients, or the like. In some exemplary embodiments, the agent may be a user-operated client, where the user may instruct the client to save a specific screen encountered by the user in a session. Additionally, or alternatively, the agent may report websites, screens, DOMs, or the like, visited by the user without the user's instruction. Additionally, or alternatively, the agent may crawl websites or any other executed program and report them autonomously.

In some exemplary embodiments, the agent may be executed on a client device and communicate information between the client device and a server. In some exemplary embodiments, the server may utilize the information in order to determine a unique identifier of GUI elements, which may enable to perform a walkthrough, analytics, process automation, adding a display layer, augmenting functionality of the GUI, or the like.

On Step 210, the agent may obtain a text string of a GUI element that is to be sent to the server. In some exemplary embodiments, the data to be sent may include a text string that is associated with a GUI element that was selected by the user, one or more text strings that are included in the GUI element and may be presented to the user or hidden, text strings that are associated with the entire GUI, one or more text strings that are associated with a subset of the GUI, a text string that is associated with a specific element thereof, text strings that are associated with one or more types of GUI elements in the GUI, or the like. In some exemplary embodiments, the text strings may comprise text, attributes, URLs, Uniform Resource Identifiers (URIs), DOM properties such as inner text or attribute text, hidden or visible portions of one or more GUI elements, or the like. For example, for an HTML document, a text string may include an inner text between <div> tags, e.g., <div>Text</div>. As another example, a text string may include text of an HTML attribute such as <div title="Text"></div>. In some exemplary embodiments, in case the GUI element is part of a webpage, website, or the like, the text string of the GUI element may comprise an HTML element. As an example, the GUI of a program executed at the end device may be Google™ home page. The GUI element may be the search area in which users may type a text, which may be an HTML element. According to this example, the search area may be obtained by searching for "div id=searchBox". As another example, the GUI may be a screen in a Google™ Search mobile application, instead of a web application. The screen may comprise a GUI element such as a search box, which may be identified in a different manner, such as identified as "android:id="searchBox"".

In some exemplary embodiments, the text string may be obtained by the agent as part of an automation process, of a walkthrough, or the like. Additionally or alternatively, the text string may be obtained by the agent automatically, e.g., based on defined elements of interest, such as elements for which performance measurements may be tracked. In some exemplary embodiments, the text string may be obtained by the agent in response to a selection of the GUI element by the user, e.g., so that a server may be able to analyze the GUI element in order to provide functionality to the user, such as a walkthrough. In some exemplary embodiments, the text string may be obtained by the agent in response to any other action, or regardless of the user's actions. In some exemplary embodiments, text strings obtained by the agent may exclude tokens, keywords, tags, or the like. For example, for an HTML document, the agent may not obtain HTML tokens such as the <div> tag or the "title" keyword. In other cases, tokens, keywords, tags, or the like may not be excluded.

On Step 220, the agent may semi-transform the text string of the GUI element, e.g., to obtain a semi-transformed text string including a transformed portion and a plaintext portion. In some exemplary embodiments, semi-transforming may include hashing or otherwise transforming a first portion of the text string of the GUI element according to a transformation function to obtain the transformed portion, while keeping in plaintext the remaining second portion, e.g., the plaintext portion. In some exemplary embodiments, the transformed portion and the plaintext portion may each include one or more portions of the text string that are adjacent to each other or alternatively detached.

In some exemplary embodiments, the transformation function may comprise a one-way hash function, a symmetric encryption function, an asymmetric encryption function, or the like. In some cases, the transformation function that may include a generic hash function such as SHA-256 or MD5, or a non-generic hash function such as a customized one-way function. In some cases, symmetrical or asymmetrical encryption may be used in case the receiving party (such as the server) does not hold the encryption key and only the sender (the client) holds the key.

In some exemplary embodiments, different transformation functions may be selected and used for different text strings. For example, a first transformation function may be selected for a first text string, while a second transformation function may be selected for a second text string. According to this example, a first portion of the first text string may be transformed according to the first transformation function while a first portion of the second text string may be transformed according to the second transformation function, thereby obtaining first and second semi-transformed text strings. In some exemplary embodiments, a different transformation function may be used for different groups of client devices, respectively. For example, client devices that are associated with bank workers of a certain bank may use a first hash function for encrypting data, while client devices that are associated with a certain fashion store, e.g., Zara™, may use a second hash function for encrypting data. In some exemplary embodiments, a different transformation function may be used for different types of GUI elements, respectively. For example, each HTML element type such as a button type and a text box type, may be associated with a different transformation function. In some exemplary embodiments, a different transformation function may be used according to any other classification rules. In some cases, a same transformation function may be used for end devices.

In some exemplary embodiments, a length or character count of the portion of the text string that is to be transformed may be retained by the agent, e.g., along with the text string. In case the length of the to-be-transformed substring is not known in advance by a receiver of the message, the length of the substring may be provided to the server, e.g., along with the semi-transformed text string. For example, a transformation function may transform a portion of three characters such as "her" to a transformed portion of six characters, such as "hc7ays". According to this example, the agent may keep the original size, e.g., three, along with the text string or the semi-transformed text string. In some exemplary embodiments, in addition to a text string, attributes such as images may be semi-transformed or hashed as well.

In some exemplary embodiments, the amount of plaintext letters that are not transformed in each text string may be defined or agreed upon, e.g., by the server, the agents, the users, an administrator user, or the like. In some exemplary embodiments, the amount of plaintext letters in each semi-transformed text string may be defined to be short enough so that it cannot include sensitive text, e.g., one, two, three, four, five letters, or the like. In some exemplary embodiments, instead of defining long plaintext lengths that are unique in the GUI, the system may compromise on a non-unique text that can be guaranteed to be not sensitive. For example, a plaintext length of 12 letters may be too long, as it may contain full words that may be sensitive. In some exemplary embodiments, the amount of plaintext letters in each semi-transformed text string may be constant, dynamic, based on rules, based on the length of the word, heuristics, instructions, or the like. For example, a first amount of plaintext letters may be determined for a first type of GUI element, and a different amount of plaintext letters may be determined for a second type of GUI element. Alternatively, the transformed text strings may have a same amount of plaintext letters. In some exemplary embodiments, the amount of plaintext letters in each semi-transformed text string may be determined dynamically by finding the shortest string, which is unique in the page, or has a small number of similar strings, making the candidate list shorter.

In some exemplary embodiments, the location of the plaintext letters within each text string may be defined or agreed upon, e.g., by the server, the agents, the users, or the like. In some exemplary embodiments, the location of the plaintext letters in each text string may be constant, dynamic, based on rules, or the like. In some exemplary embodiments, the location of the plaintext letters in each text string may be defined as a prefix of a certain length, a suffix of a certain length, or any other substring location of the text string of a certain length, that may be relatively unique, e.g., to provide a short list of candidates in the GUI, while being privacy-preserving. For example, the location of the plaintext letters may be defined as the first and last letters of the string, the first and third letters, or the like. In some cases, the location of the plaintext letters in each text string may be determined dynamically by finding a location that is unique in the page, or by finding a location that a small number of similar results.

In some exemplary embodiments, the semi-transformed text string may comprise a plurality of non-consecutive plaintext sequences. For example, the prefix of 2 characters may be retained as is, followed by 5 characters that are transformed, followed by another 3 characters that are retained, and the remainder portion of the string may be transformed. Such an embodiment may increase the total number of plaintext characters that are preserved, and which may be utilized for string-based query analysis, without divulging private information.

In some exemplary embodiments, in case the text string is long, it may be identifiable by a substring, e.g., alone, which may be semi-transformed instead of the entire string. In other cases, the entire long string may be semi-transformed. For example, the text string: “Please click here to enable your account” may be considered a long string. Accordingly, the substring “our acc” may be determined to be unique enough to find the element swiftly. According to this example, the substring “our acc” may be transformed in part to “ouFCVX34”, while the rest of the text string may not be provided to the server. As an example, for the substring “our acc” that may be transformed in part as “ouFCVX34”, the following message may be sent to the server: {plaintext: “ou”, hash: “FCVX34”, hash-length: 5}, where the hash-length may include the length of the hashed portion “r acc”. In some exemplary cases, semi-transforming substrings of long text strings may have one or more disadvantages, e.g., such as in case the server is utilized for analytics purposes. For example, an administrator user may define keywords for which he may wish to track user behavior. For example, the administrator user may wish to count how many times a GUI element that contains the text “test”, in a semi-transformed manner, was clicked. This may include the following GUI element texts: “test”, “this is a test”, “hi test bye”, or the like, in a specified program. Since the word “test” may appear as part of a long text string including a full sentence, semi-transforming a substring of the entire sentence will not allow the administrator user to find the word “test” in it, in plaintext or in a semi-transformed version. In some exemplary embodiments, a possible solution may be to semi-transform each word in the sentence separately and send them to the server independently.

In some exemplary embodiments, a salt may be used in addition to the transformation function. The salt may include random data that may be appended to a substring prior to being transformed. In some exemplary embodiments, the appended substring may be transformed with the transformation function that is used such as the one-way hash function. For example, the word “Submit” will be transformed as “Su5Fd3fds” in one instance with first salt but transformed as “SuJggb436” in another instance with second salt. In some exemplary embodiments, salts that were used when initially transforming a string may be retained at one or more agents and be re-used when searching for or locating the string in a later stage. In some exemplary embodiments, different salts may be used for different clients, for different groups of end users, for different types of GUI elements, or the like. In some exemplary embodiments, a same transformation function may be used with different salts, a same salt may be used for different transformation functions, or alternatively, different salts may be used for different transformation functions. For example, users from different organizations may be associated with their own organization’s salt but may all share a same transformation function. In some exemplary embodiments, the salt may enhance a security level by making it computationally challenging to reverse the transformed text using rainbow tables, brute-force attacks, or the like.

On Step 230, the agent may send the semi-transformed text string of the GUI element to the server. In some exemplary embodiments, the agent may send to the server text, attributes, or the like of the GUI element that are hashed, encrypted or otherwise transformed in part, e.g., as performed at Step 220.

In some exemplary embodiments, in addition to the semi-transformed text string, a character length (also referred to as “character count”) of the first portion may be provided to the server. In some exemplary embodiments, the character length may indicate a count of characters of the first portion, a size of the first portion, a length of the first portion, or the like. In some exemplary embodiments, the transformed portion of the semi-transformed text string may have a different character-wise length than the original second portion of the text string. In other cases, the length may be similar or identical. In some exemplary embodiments, the location and length of the plaintext portion, e.g., the second portion, may be provided to the server or may be predefined.

In some exemplary embodiments, a number of characters of the plaintext portion, e.g., the second portion, may be defined or determined based on a count of candidate elements in the GUI comprising or associated with text strings that correspond to the number of characters of the second portion. In some exemplary embodiments, a query of a defined number of characters that results with a relatively small number of candidate elements may be selected, e.g., under privacy constraints, while a defined number of characters that results with a larger number of candidate elements may not be selected. For example, a query of a plaintext portion of two characters may result with five candidate elements, while a query of a plaintext portion of three characters may result with one candidate element. In such cases, in case privacy constraints enables to select a length of three characters, a length of three characters may be selected. In other cases, the number of characters of the plaintext portion may be predefined, provided by the server, determined by the user, or determined in any other manner.

In some exemplary embodiments, a relative location of the second portion within the text string may be determined or defined, e.g., relative to the text string. The relative location may be selected based on a count of candidate elements in the GUI that are associated with, or comprise, text strings corresponding to the relative location. In other cases, the relative location of the plaintext portion may be predefined, provided by the server, determined by the user, or determined in any other manner. In some exemplary embodiments, a determined relative location, e.g., a prefix, that results with a relatively small number of candidate elements may be selected, e.g., under privacy constraints, while a relative location of the plaintext portion that results with a larger number of candidate elements may not be selected. For example, determining the second portion as the prefix of the string may result with two candidates, while determining the second portion as the suffix of the string may result with ten candidates. In such cases, the relative location may be selected to be the prefix. In some exemplary embodiments, relative locations may be determined for different numbers of characters of the plaintext, or vice versa. In some exemplary embodiments, the determination may be specific for a specific text string, a specific formatted document, a type of formatted document (e.g., pages of a specific website or application), or the like. In some exemplary embodiments, the determination may be performed based on statistical analysis of expected number of candidates instead of or in addition to a concrete determination of the number of candidates in a specific document or corpus of documents.

In some exemplary embodiments, the display of the end device may or may not show elements that are provided to the server. For example, a user of an end device may upload GUI elements that are selected by a mouse click, and each such GUI element that is selected by the user may cause a semi-transformed text string to be shown to the user during or prior to being sent to the server. The semi-transformed text string may include a semi-transformed version of a text that is associated with the GUI element, such as HTML attributes of the GUI element. In other cases, the semi-transformed text strings may be uploaded automatically without causing an effect on the user's display.

Figure 3:
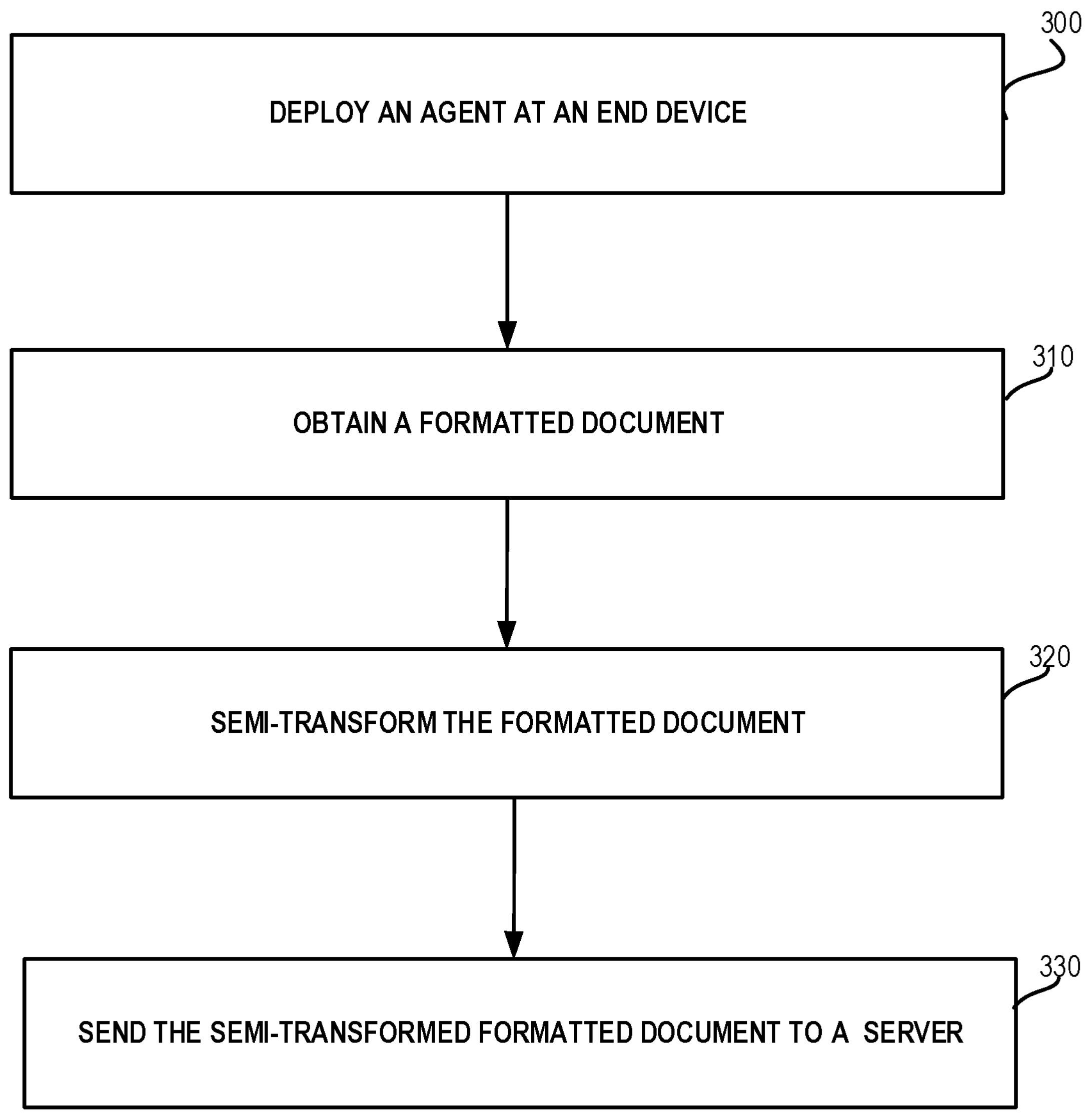
FIG. 3 illustrates a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 300, an agent may be deployed at an end device of a user. In some exemplary embodiments, while deploying the agent, the end device may execute one or more programs, e.g., mobile programs, desktop programs, web programs, or the like. In some exemplary embodiments, the agent may comprise one or more crawlers, scripts, software products, user-operated clients, or the like. In some exemplary embodiments, the agent may be a user-operated client, where the user may instruct the client to save a specific screen encountered by the user in a session. Additionally, or alternatively, the agent may report websites, screens, DOMs, or the like, visited by the user without the user's instruction. Additionally, or alternatively, the agent may crawl websites or any other linked formatted documents and report them autonomously.

In some exemplary embodiments, the agent may be executed on a client device and communicate information between the client device and a server. In some exemplary embodiments, the server may utilize the information in order to determine a unique identifier of GUI elements, which may enable to perform a walkthrough, analytics, process automation, adding a display layer, augmenting functionality of the GUI, or the like.

On Step 310, the agent may obtain a formatted document or representation thereof (referred to as the formatted document) depicting at least a portion of a displayed GUI that is to be sent to the server. In some exemplary embodiments, the formatted document may include a structure, a format, a form, a layout, or the like, which may define a plurality of sub-elements, locations thereof, or the like, within the formatted document. In some exemplary embodiments, the plurality of sub-elements may comprise GUI elements, associated text strings, structure elements, graphical elements, hidden tags or marks, or the like. In some exemplary embodiments, the data to be sent may include visible or hidden text strings in the formatted document, formatting or structural elements of the formatted document, or the like.

In some exemplary embodiments, the formatted document may be obtained by the agent as part of an automation process, of a walkthrough, or the like. Additionally or alternatively, the formatted document may be obtained by the agent automatically, e.g., based on defined elements of interest, such as elements for which performance measurements may be tracked. In some exemplary embodiments, the formatted document may be obtained by the agent in response to a selection of a GUI area by the user, e.g., so that a server may be able to analyze the GUI area in order to provide functionality to the user, monitor interaction and engagement metrics thereof, or the like. In some exemplary embodiments, the formatted document may be obtained by the agent in response to any other action, or regardless of the user's actions.

On Step 320, the agent may semi-transform the formatted document, e.g., to obtain a semi-transformed formatted document including a transformed portion and a preserved portion. In some exemplary embodiments, semi-transforming may include hashing or otherwise transforming a portion of the formatted document according to one or more transformation functions to obtain the transformed portion, while preserving the remaining formatted document, e.g., the structure of the formatted document, the non-sensitive portions of the formatted document, or the like. In some exemplary embodiments, each portion of the formatted document may comprise one or more areas in the GUI, sub-elements, types of elements, attributes, or the like.

In some exemplary embodiments, the transformation function may comprise a one-way hash function, a symmetric encryption function, an asymmetric encryption function, or the like. In some cases, the transformation function may include a generic hash function such as SHA-256 or MD5, or a non-generic hash function such as a customized one-way function. In some cases, symmetrical or asymmetrical encryption may be used in case the receiving party (such as the server) does not hold the encryption key and only the sender (the client) holds the key. In some exemplary embodiments, the transformation function may include any encryption technique that may not enable third parties such as the server to restore content of the data that is sent using the encryption technique. In some exemplary embodiments, different transformation functions may be used for different types of attributes, GUI elements, or the like.

In some exemplary embodiments, a salt may be used in addition to the transformation function. The salt may include random data that may be appended to a substring prior to being transformed. In some exemplary embodiments, the appended substring may be transformed with the transformation function that is used such as the one-way hash function. In some exemplary embodiments, salts that were used when initially transforming a string may be retained at one or more agents and be re-used when searching for or locating the string in a later stage. In some exemplary embodiments, different salts may be used for different clients, for different groups of end users, for different types of GUI elements, or the like. In some exemplary embodiments, a same transformation function may be used with different salts, a same salt may be used for different transformation functions, different salts may be used for different transformation functions, or the like. For example, users from different organizations may be associated with their own organization's salt but may all share a same transformation function. In some exemplary embodiments, the salt may enhance a security level by making it computationally challenging to reverse the transformed text using rainbow tables, brute-force attacks, or the like.

In some exemplary embodiments, the transformation function may be applied to a first portion of the formatted document, such as a text portion or any other portion, and not to a second portion of the formatted document, such as the structure of the formatted document. In some exemplary embodiments, performing the semi-transformation may comprise selecting, from the formatted document, text strings to be transformed, while not transforming unselected text strings. In some exemplary embodiments, the transformation function may be applied on the selected text strings, and not on the unselected text strings.

In some exemplary embodiments, any element of the formatted document that is required for rendering the formatted document by a rendering engine, may be preserved and may not be transformed. In some exemplary embodiments, text strings that define compilation elements such as a syntax element of a markup language, a token of a markup language, elements that are required for a lexical analysis, elements that are required for a syntax analysis such as for scanning or parsing, elements that are required for a semantic analysis, or the like, may not be transformed. In some exemplary embodiments, tags, attributes, or any other structural or non-sensitive text strings in the formatted document may not be selected to be transformed. In some exemplary embodiments, text strings that are not potentially sensitive may be preserved as well without being transformed. In some exemplary embodiments, text strings may be determined to be non-sensitive based on indications of non-sensitive types of GUI elements, based on lists indicating phrases as non-sensitive, based on a classifier, heuristics, or the like.

In some exemplary embodiments, text strings that are not compilation elements such as text strings that are inserted between tags, text strings that define values of attributes, or the like, may or may not be transformed, e.g., based on whether or not they are determined to comprise potentially sensitive information. In some exemplary embodiments, the text strings may be selected based on a determination that an attribute defines a sensitive attribute, and that a text string of the attribute defines an attribute value of the attribute. In such cases, the attribute may be preserved, while the attribute value may or may not be transformed, e.g., based on whether it may be potentially sensitive.

In some exemplary embodiments, the transformation of the text string itself may be in whole, e.g., a full transformation, or in part, e.g., a semi-transformation.

On Step 330, the agent may send the semi-transformed formatted document to the server. In some exemplary embodiments, the agent may send to the server text, attributes, or the like of the formatted document, some of which may be preserved without being transformed and some of which being hashed, encrypted or otherwise transformed at least in part, e.g., according to Step 320.

In some exemplary embodiments, the second device may be enabled to perform structure-based analysis of the formatted document without being exposed to a content of sensitive information, e.g., since the content may be at least partially transformed.

Figure 4:
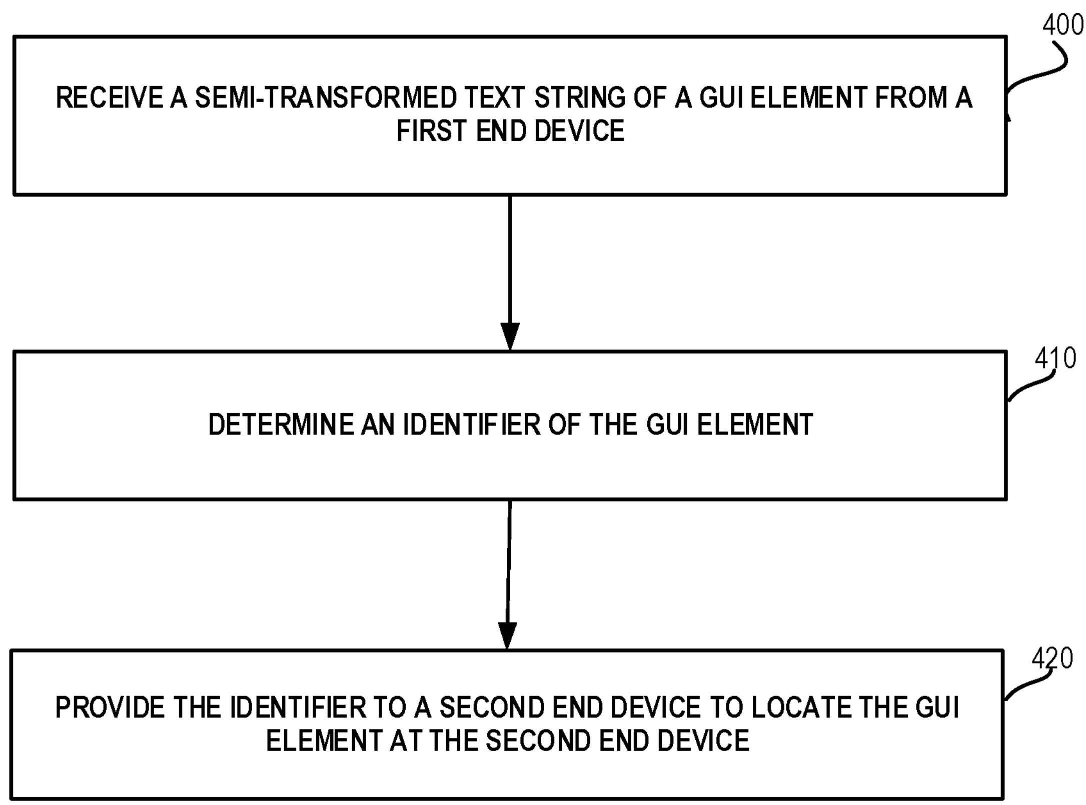
FIG. 4 illustrates a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

On Step 400, a server may receive semi-transformed or fully transformed text strings (referred to as transformed text strings) from one or more end devices. In some exemplary embodiments, the server may receive from a first end device a transformed text string of a GUI element. For example, the GUI element may include a <div> element having "title" attribute with the value "Submit" in a native mobile application. In case of semi-transformation, the agent at the first end device may obtain the text string "Submit" and semi-transform it to obtain the semi-transformed text string "SuKy5stjfk67e7d". Next, the agent at the first end device may provide the text string "SuKy5stjfk67e7d" to the server, e.g., along with a length of the remaining text, e.g., a character length of four, for the remaining substring "bmit". In some exemplary embodiments, the server may obtain the transformed text string from the first end device. In case of full transformation, the agent at the first end device may obtain the text string "Submit" and transform it to obtain the fully transformed text string "psojtsdmvi7d8Ky5stjfk67e7d". Next, the agent at the first end device may provide the text string "psojtsdmvi7d8Ky5stjfk67e7d" to the server, e.g., along with structural identifiers such as a location of the text string, a character length of the original string, e.g., a length of 6 for "Submit", a context of the text string, or the like. In some exemplary embodiments, the server may obtain the transformed text string from the first end device.

On Step 410, the server may utilize the transformed text string in a computation or processing that it performs. As an example, the server may determine an element identifier of the GUI element. The element identifier may be based on the attributes of the target element, attributes of other elements, relationship between elements, or the like. In some exemplary embodiments, the element identifier may uniquely identify the GUI element over different devices, platforms, program versions, or the like. In some exemplary embodiments, the GUI element may be subsequently acquired using the element identifier, e.g., a global identifier, which may be useful for identifying the GUI element over a plurality of devices. In some exemplary embodiments, the determined element identifier may include a query associated with the semi-transformed text string, the fully transformed text string, a context of the GUI element, a location of the GUI element, or the like. In some exemplary embodiments, in case of a semi-transformed text string, the query may be configured to first perform a string-based operation using the plaintext portion of the semi-transformed string to identify potential candidates, then apply the semi-transformation on text strings of the candidates and select therebetween the element in view of the transformed portion of the semi-transformed text string. In case of a fully transformed text string, the query may be configured to first perform a structure-based query using the structure of the semi-transformed formatted document to identify potential candidates, then apply the transformation function on text strings of the candidates and select therebetween the element in view of the fully transformed text string.

In some exemplary embodiments, the element identifier may be determined based on one or more transformed text strings uploaded by an end device. For example, an end device may upload a transformed text string of a text string of a GUI element such as a button, and the server may determine an element identifier of the button to include a query that finds the transformed text string in the GUI.

In some exemplary embodiments, the element identifier may enable the server to analyze behavior patterns or provide access to the stored data to analyzing parties. In some exemplary embodiments, one or more behavioral patterns and statistical results that may be useful for advertising, navigation, or the like may be determined based on identifying an element in different end devices. For example, this may enable the server to identify GUI elements that need a walkthrough, to gather statistics regarding identified GUI elements in different client devices, or the like.

On Step 420, the server may provide the element identifier of the GUI element to a second end device, e.g., to gather statistics regarding the GUI element, or to identify a corresponding GUI element or text string thereof for any other use. In some exemplary embodiments, based on the element identifier, an agent at the second end device may apply the element identifier to locate the corresponding GUI element identified by the element identifier. This may be done by applying a query of the element identifier. In some exemplary embodiments, upon attempting to find the GUI element on client side, e.g., at the second end device, the algorithm may iterate over all of the associated elements at the second end device.

In some cases, for a query comprising a semi-transformed text string, the algorithm may iterate over all of the elements of the same type as the GUI element, find elements with a same plaintext portion at the defined location, find elements that, excluding a length of the plaintext, have a remaining character length that is indicated by the element identifier, calculate the transformation value of the remaining text of each candidate element's text string, and find one or more elements that have a transformation value (if exists) that is identical to the transformation value indicated by the element identifier.

For example, consider the original string "hello". A semi-transformation text string is "he3f5KFvc3". In some exemplary embodiments, an agent of the second end device may fetch a query searching for a text string of a GUI element of type <div> that includes the plaintext portion of the semi-transformation text string "he" and when implementing the transformation function on the remaining text, has a value of "3f5KFvc3", with an original length of three. The downloaded element identifier may be retained as "<DIV> with plaintext equals to "he" and transformed text equals to "3f5KFvc3" of length 3". In other cases, the downloaded element identifier may be retained in any other manner, order, or the like. In some exemplary embodiments, upon attempting to find a <div> GUI element identified by the semi-transformed text string "he3f5KFvc3", the agent may first identify all <DIV> elements that start with the substring "he". Then, for each matching string with a remaining length of three characters, a transformation value of the remaining text may be calculated. In some exemplary embodiments, in case the transformation value of the rest of the text equals to the transformation value defined in the query, e.g., 3f5KFvc3, it may be determined that a match was found. For example: search results on a webpage may return three <DIV> elements with the texts: "head", "heels" and "hello". The transformation values may be calculated only for the underline part of "heels" and "hello", as they both have a correct length of three characters. If a determined transformation value matches "3f5KFvc3", i.e., for the substring "llo", then the element may be determined to be identified and found.

In some cases, for a query comprising a fully transformed text string, the algorithm may iterate over all of the elements of the same type as the GUI element, find elements with a same relative location in the GUI, find elements with a same context as the GUI element, find elements that have a character length that is indicated by the element identifier, calculate the transformation value of each candidate element's text string, and find one or more elements (if exists) that have a transformation value that is identical to the transformation value indicated by the element identifier.

In some exemplary embodiments, this may enable the server to achieve the required functionality, e.g., providing an element identifier to be applied by clients having non-encrypted data, without compromising on a privacy level of the sensitive data.

Figure 5:
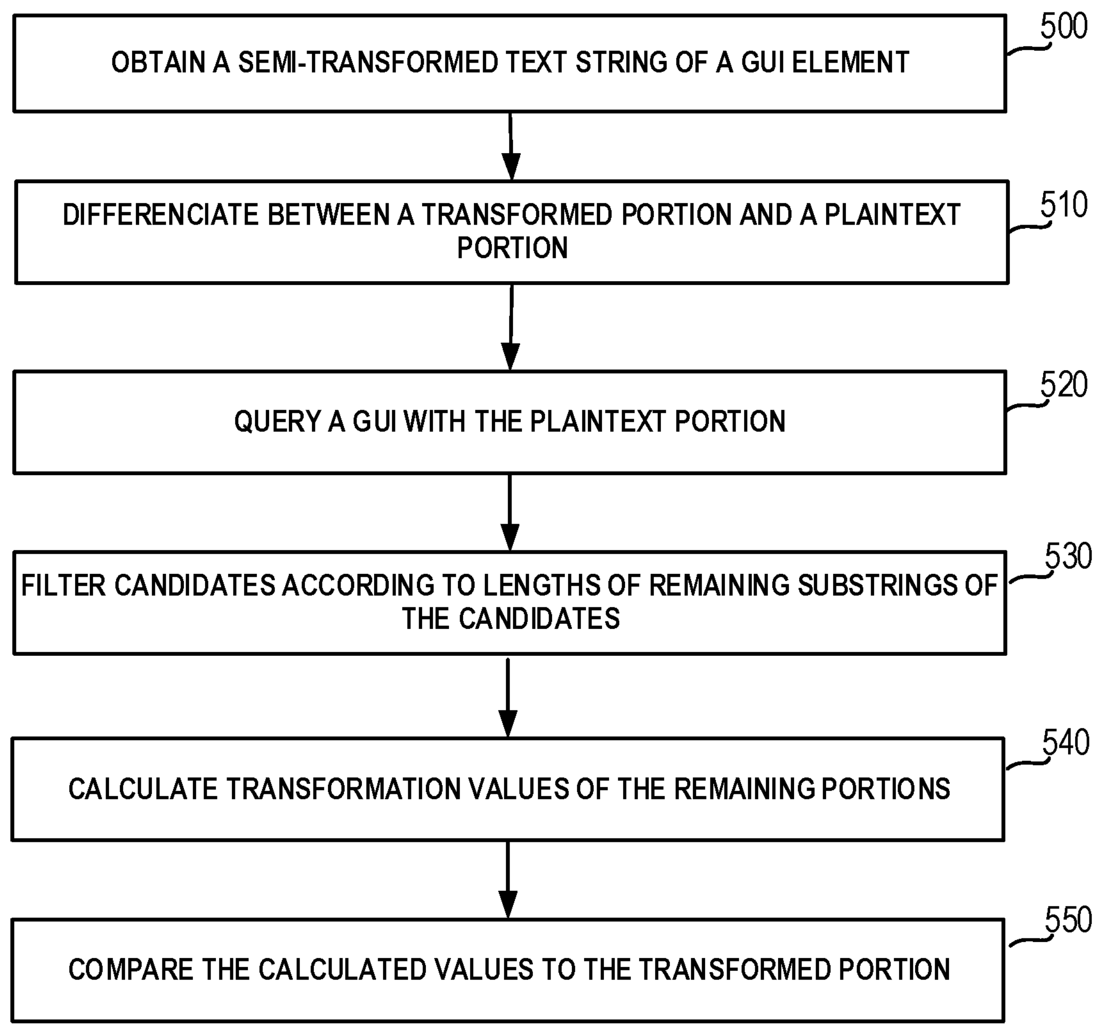
FIG. 5 illustrates a flowchart diagram of a method, in accordance with some exemplary embodiments of the disclosed subject matter.

Referring now to FIG. 5 showing a flowchart diagram of a method of utilizing an element identifier of a semi-transformed text string, in accordance with some exemplary embodiments of the disclosed subject matter.

On Step 500, a server may provide to an agent deployed at an end device an element identifier indicating a semi-transformed text string of a GUI element. In some exemplary embodiments, the semi-transformed text string may comprise a result of a semi-transformation of a text string. In some exemplary embodiments, the semi-transformation may include semi-transforming a text string including text, attributes, images, or the like, according to a transformation function. In some exemplary embodiments, the semi-transformed text string may be a result of applying the transformation function on a portion of the text string. For example, for an original "Submit" text string, the semi transformed version may be "Su5Fd3fds", where "5Fd3fds" is the transformed portion, and "Su" is a plaintext portion that is not transformed.

In some exemplary embodiments, the server may or may not provide, along with the semi-transformed text string of the GUI element, a character count of a portion of the text string that was transformed by the transformation function, additional information that may be associated to the GUI element such as corresponding walkthrough instructions, additional identification information such as a relative location of the GUI element in the GUI, or the like. In some exemplary embodiments, the character count may comprise a count of characters of the portion of the text string, e.g., prior to the semi-transformation. In some exemplary embodiments, the character count may be provided as part of the element identifier, separately, or the like.

In some exemplary embodiments, the agent may obtain the element identifier from the server. In some exemplary embodiments, the agent may attempt to locate or find the represented GUI element identified by the element identifier at the client side, e.g., in a GUI displayed at the end device. In some exemplary embodiments, the agent at the end device may not be able to de-transform the semi-transformed text string to obtain a plaintext version of the semi-transformed text string, e.g., as the transformation function that was used may be a one-way function or as the client may not have access to a decryption key useful for decrypting the cyphertext. In order to locate the semi-transformed text string of the end device, the agent may utilize the element identifier to identify the associated GUI element in the GUI, e.g., in its plaintext version. In some exemplary embodiments, the element identifier may include a query on a plaintext portion of the semi-transformed text string that locates potential candidates having text strings with the plaintext portion, a query on a length of the remaining portion, and a query on a transformation value of the remaining portion, e.g., which may be calculated to ensure the transformation value is equal to the value of the encrypted-in-part element. For example, it may be desired to locate a GUI element in order to modify its visual appearance, introduce an element next thereto, or a similar manipulation that may be implemented for injecting a walkthrough into an existing GUI.

On Step 510, the agent may differentiate between a transformed portion and a plaintext portion of the semi-transformed text string of the GUI element. In some exemplary embodiments, a location and length of the plaintext portion of the semi-transformed text string may be predetermined, predefined in a protocol, provided by the server, or the like.

On Step 520, the agent may perform a query on a GUI of the end device with the plaintext portion, e.g., to detect candidate elements in the GUI that have associated text strings with the plaintext portion. In some exemplary embodiments, when attempting to find the GUI element that was transformed in part in the end device, the plaintext substring may be first identified. In some exemplary embodiments, any other order of queries may be utilized.

On Step 530, the agent may filter a list of candidates resulting from Step 520 according to a target character count of a remaining substring of the candidate list. In some exemplary embodiments, locating the semi-transformed text string may include utilizing the character count to determine one or more candidate elements with associated text strings that have a corresponding character count (if exist). In some exemplary embodiments, the server may perform a query to detect, within the list of potential candidates, one or more candidates with associated text strings that have a number of characters that corresponds to the provided character length of the transformed portion of the original GUI element. In some exemplary embodiments, a remaining substring of a text string may include the text string without the plaintext part. In some exemplary embodiments, for each occurrence of the plaintext substring in the end device's page, a length of the remaining substring may be determined and compared with the target character length. In some exemplary embodiments, in case the list of candidates includes no more than one candidate, or in case the server has not provided the character length of the remaining substring, Step 530 may not be performed, and the method may continue to Step 540. In other cases, Step 530 may be performed even in case the list of candidates includes only one candidate.

On Step 540, the agent may calculate a transformation value for each remaining substring in the text strings of the candidate list, e.g., that resulted from performing Step 520 or Step 530. In some exemplary embodiments, the agent may use the transformation function. In some exemplary embodiments, transformation values of the remaining substrings may be calculated according to the transformation function.

On Step 550, the agent may compare the calculated transformation values to the transformed portion of the semi-transformed text string and select GUI elements that have an identical transformation value, e.g., indicating that their text string is identical to the original text string of the semi-transformed text string, e.g., prior to being semi-transformed. In some exemplary embodiments, determining that a transformed portion of a text string that is associated with a candidate element is identical to the transformed portion of the semi-transformed text string may indicate that the GUI element was successfully located using the element identifier.

For example, for a transformed portion of "FCVX34", a transformation value of each remaining substring in text strings of the candidates list at end device's page may be calculated to determine whether its value equals "FCVX34". In case a transformation value of a remaining substring is found to have a value of "FCVX34", the GUI element associated with the remaining substring may be identified as being the searched-for GUI element.

It is noted that the above may be performed with respect to any element in the GUI. In some cases, the target element may be identified based on other elements, such as elements containing the target element, elements located in proximity to the target element, or the like. Each such element that may be utilized to identify the target element, directly or indirectly, may be identified based on textual properties thereof, such as the values of textual attributes, and may be the subject of a query in accordance with the disclosed subject matter. As an example, a first query may identify a containing element, a second query may identify a second element within the containing element, and a third query may be utilized to identify the target element based on its relationship with the second element.

Figure 6:
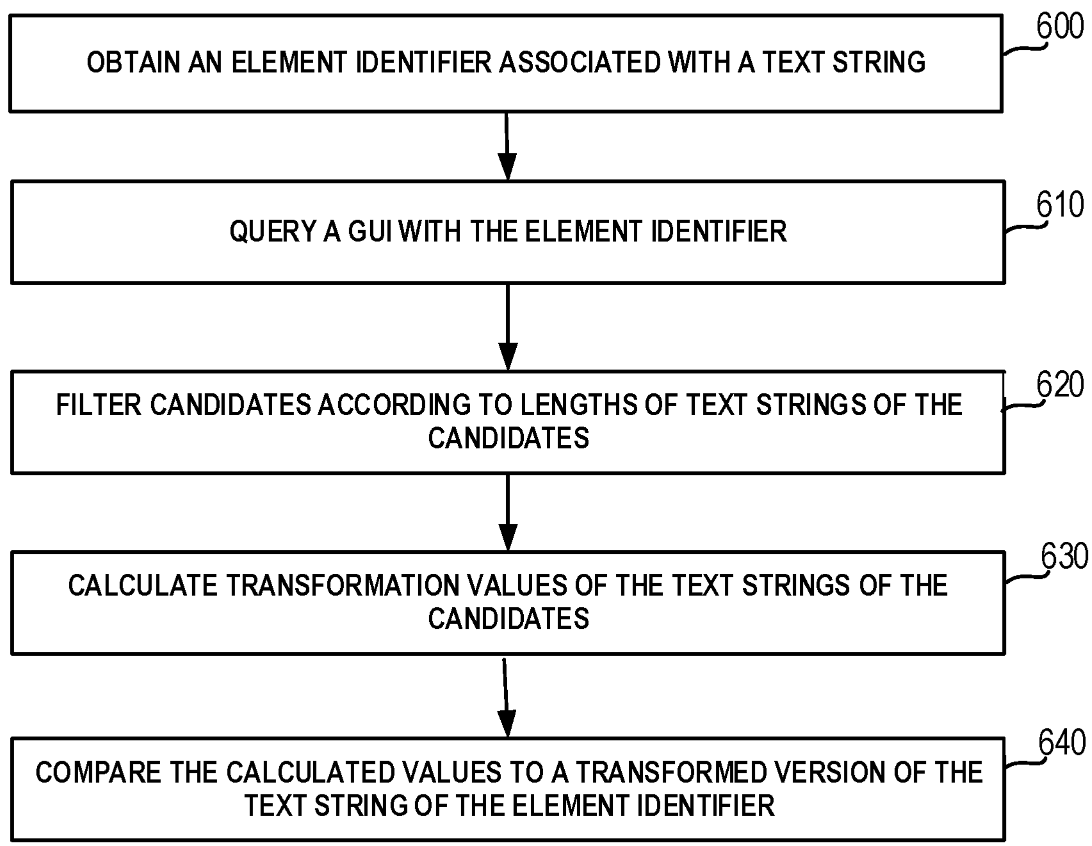
FIG. 6 illustrates a flowchart diagram of a method, in accordance with some exemplary embodiments of the disclosed subject matter.

Referring now to FIG. 6 showing a flowchart diagram of a method of utilizing an element identifier of a fully transformed text string, in accordance with some exemplary embodiments of the disclosed subject matter.

On Step 600, a server may provide to an agent deployed at an end device an element identifier of a first GUI element indicating a fully transformed version of a text string of the first GUI element. In some exemplary embodiments, the transformed version may comprise a result of a transformation of the text string of the first GUI element according to a transformation function. In some exemplary embodiments, the transformation function may be applied on the text string, e.g., at a different end device, at the same end device, or the like.

In some exemplary embodiments, the element identifier may be configured to globally identify a GUI element in a GUI, a screen, a display, or the like, which may be utilized in any of a plurality of end devices. In some exemplary embodiments, the agent may obtain the element identifier from the server. In some exemplary embodiments, the agent may attempt to locate or find the represented GUI element identified by the element identifier at the client side, e.g., in a GUI displayed at the end device.

In some exemplary embodiments, the agent at the end device may not be able to de-transform the transformed text string to obtain a plaintext version of the transformed text string, e.g., as the transformation function that was used may be a one-way function or as the client may not have access to a decryption key useful for decrypting the cyphertext. In order to locate the transformed text string of the end device, the agent may utilize the element identifier to identify a context of the associated GUI element in the GUI.

In some exemplary embodiments, the server may or may not provide, along with the transformed text string of the GUI element, a character count of the text string that was transformed by the transformation function, e.g., since the character count may change after applying the transformation function on the text string. In some exemplary embodiments, the character count may comprise a count of characters of the text string, e.g., prior to the transformation. In some exemplary embodiments, the character count may be provided as part of the element identifier, separately, or the like.

On Step 610, the agent may perform a query on a GUI of the end device to detect candidate elements in the GUI. In some exemplary embodiments, using the query, the agent may locate, e.g., in a GUI of the end device, a second GUI element associated with the element identifier. In some exemplary embodiments, the element identifier may include a query on the transformed text string that locates potential candidates having a same context as the first GUI element, having a same structure as the first GUI element, having a same attribute type as the first GUI element, having a same length as the first GUI element, having a same transformation value as transformed version of the text string of the first GUI element, or the like. In some exemplary embodiments, the query may include a search that may be performed using structural or non-sensitive elements associated with the text string. In some exemplary embodiments, locating the second GUI element may comprise executing the query of the element identifier to determine one or more candidate elements in the GUI.

On Step 620, the agent may filter a list of candidates resulting from one or more queries of Step 610 according to a target character count. In some exemplary embodiments, the character count may be utilized to determine one or more candidate elements with associated text strings that have a corresponding character count (if exist). In some exemplary embodiments, the server may perform a query to detect, within the list of potential candidates, one or more candidates with associated text strings that have a number of characters that corresponds to the provided character length of the transformed portion of the original GUI element. In some exemplary embodiments, in case the list of candidates includes no more than one candidate, or in case the server has not provided the character length of the remaining substring, Step 620 may not be performed, and the method may continue to Step 630. In other cases, Step 620 may be performed even in case the list of candidates includes only one candidate.

On Step 630, the agent may calculate a transformation value for the text strings of the candidate list, e.g., resulting from performing Step 610 or Step 620. In some exemplary embodiments, the agent may use the transformation function to calculate the transformation value. In some exemplary embodiments, a text string associated with the candidate element may be transformed at least in part according to the transformation function, e.g., in order to obtain a transformed version of the candidate element.

On Step 640, the agent may compare the transformed version of the candidate elements' text strings to the transformed version of the text string. In case they are identical, the agent may determine that the first and second GUI elements have the same element identifier, thus successfully locating the second GUI element in the GUI.

For example, for a transformed text string of "FCVX34", a transformation value of each remaining text strings of the candidates list at end device's page may be calculated to determine whether its value equals "FCVX34". In case a transformation value of a remaining text string is found to have a value of "FCVX34", the GUI element associated with the remaining text string may be determined to be successfully found, e.g., as the searched-for GUI element.

Figure 7:
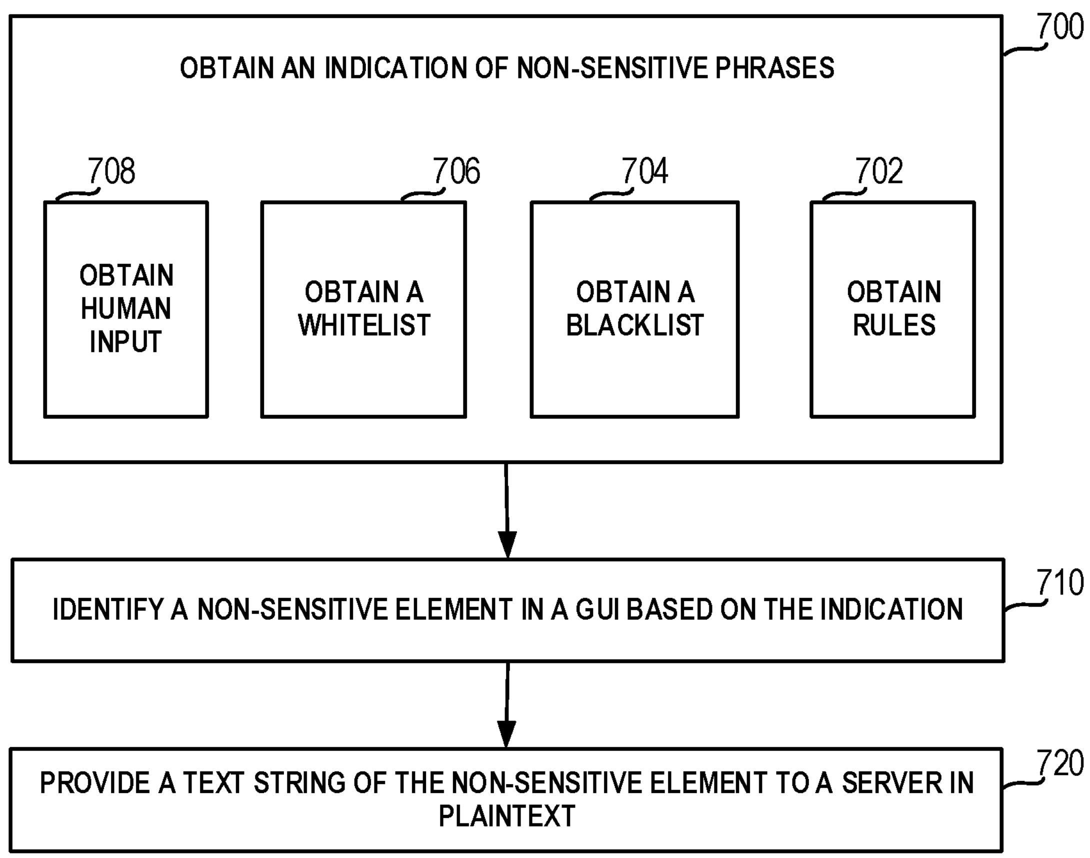
FIG. 7 illustrates a flowchart diagram of a method, in accordance with some exemplary embodiments of the disclosed subject matter.

Referring now to FIG. 7 showing a flowchart diagram of a method, in accordance with some exemplary embodiments of the disclosed subject matter.

On Step 700, indications of one or more non-sensitive elements or phrases may be obtained, e.g., at one or more agents of end devices, at an administrator counsel, or the like. In some exemplary embodiments, not all text strings in the GUI may be sensitive. In some exemplary embodiments, the GUI may typically contain generic text in menus, labels, fixed text locations, or the like, while sensitive text may be usually located in input fields or data fields. As an example, the buttons "Open" and "Save" are not sensitive. As another example, the label "First Name" may not be sensitive but the name "Alice" that appears in the data entry below the label may be sensitive. In some exemplary embodiments, semi-transforming or fully transforming all the words may have one or more disadvantages, e.g., since this may prevent the server from translating the words, or performing any other functionality that requires full phrases. Accordingly, it may be advantageous to acquire plaintext strings that are not sensitive, without transforming them even in part. Additionally, or alternatively, an administrator user who may wish to view a presentation of the GUI, as captured and reported to the server, may view cyphered text making it hard for the administrator user to view the GUI and make decisions relating thereto. In some exemplary embodiments, the indications of one or more non-sensitive elements may be defined by at least one of Steps 702-708.

On Step 702, the indications of one or more non-sensitive elements may include one or more predefined classification rules. In some exemplary embodiments, the classification rules may define phrases or elements which are not sensitive and thus may be sent untransformed. In some exemplary embodiments, the indications may include predefined rules such as a set of rules defined by a person analyzing the application, by a user, based on heuristics, or the like. In some exemplary embodiments, the classification rules may be obtained from a machine learning predictor which may be trained to identify non-sensitive GUI element types, non-sensitive classes, non-sensitive textual phrases, or the like. For example, the predefined rules may define that all the buttons of class "action" are non-sensitive; all the menu-items are non-sensitive, or the like. In some exemplary embodiments, the classification rules may be executed on a GUI of a user device to classify elements in the GUI.

For example, the classification rules may indicate that GUI elements of type "label" are not sensitive. This may define a "label" bucket, that includes all results from querying the GUI with "label". For example, all text that is part of GUI elements of type "label" may be determined to be non-sensitive.

On Step 704, the indications of one or more non-sensitive elements may be obtained as part of a blacklist. In some exemplary embodiments, the blacklist may define or indicate phrases or elements that are sensitive and thus may not be sent untransformed. In some exemplary embodiments, a blacklist may be employed in order to transform only text strings that are not indicated by the blacklist. In some exemplary embodiments, when employing a blacklist, text strings that are indicated by the blacklist as sensitive may be semi-transformed or fully transformed. Other text strings may or may not be transformed depending on utilization of additional methods, such as rule-based decisions, Machine Learning (ML) based decisions, or the like. In some exemplary embodiments, the blacklist may be defined by a predefined list of words which may comprise a set of words that is considered unsafe. In some exemplary embodiments, the blacklist may indicate sensitive phrases or elements in any other manner, e.g., based on a type of the element, defined categories, or the like.

On Step 706, the indications of one or more non-sensitive elements may be obtained as part of a whitelist. In some exemplary embodiments, the whitelist may define or indicate phrases or elements that are not sensitive. In some exemplary embodiments, the whitelist may be defined by a predefined list of words which may comprise a set of words that is considered safe. For example, the phrases "Open", "Save", and "submit" may be considered to be non-sensitive. In some exemplary embodiments, the whitelist may indicate non-sensitive phrases or elements in any other manner, e.g., based on a type of the element, defined categories, or the like. In some exemplary embodiments, non-sensitive text may typically remain constant from user to user or from a record to a record. Accordingly, employing a whitelist may be useful for indicating non-sensitive elements or words and avoiding applying full or semi-transformation thereon. In some exemplary embodiments, if a certain term is in the whitelist, the determination may be that it is not sensitive regardless of the determination of other decision methods.

On Step 708, the indications of one or more non-sensitive elements may be obtained from a human operator. In some exemplary embodiments, a human operator using a Back-office system may view the GUI in its transformed form, e.g., as submitted to the server. The person may provide input, e.g., via a click or any other instruction means, on specific elements and request them to be untransformed. The selected elements may be indicated as non-sensitive, so that in the future when a new GUI text string is obtained, the requested elements may be automatically uploaded untransformed, or may be uploaded in a manner that enables the server to retransform them, e.g., using a dictionary. In some exemplary embodiments, based on the user-input, the blacklist or whitelist may be updated. Additionally, or alternatively, the user-input may be used for supervised learning and for training a ML-based classifier for automatically estimating whether an element comprises sensitive data.

On Step 710, elements indicated as non-sensitive by the indications may be identified in the GUI of the end device. In some exemplary embodiments, text strings in the GUI of the end device may be compared to a whitelist, a blacklist, a user indication, a classification rule, or the like, in order to determine whether they are potentially sensitive or not.

On Step 720, text strings of elements that were indicated as non-sensitive, e.g., on Step 710, may be provided to the server in plaintext. In some exemplary embodiments, the text strings may comprise plaintext alone, without a transformed portion. For example, when utilizing a whitelist, the whitelist may be employed in order to transform only the sensitive text strings while not transforming the non-sensitive text strings that are listed in the whitelist. This may allow the server to utilize the text strings for performing additional analyses, such as for translation purposes.

Additionally, or alternatively, the non-sensitive text strings may still be transformed and provided to the server in such a manner. However, in addition to the transformed text string a dictionary may be provided, as is explained in more details hereinbelow.

Figure 8:
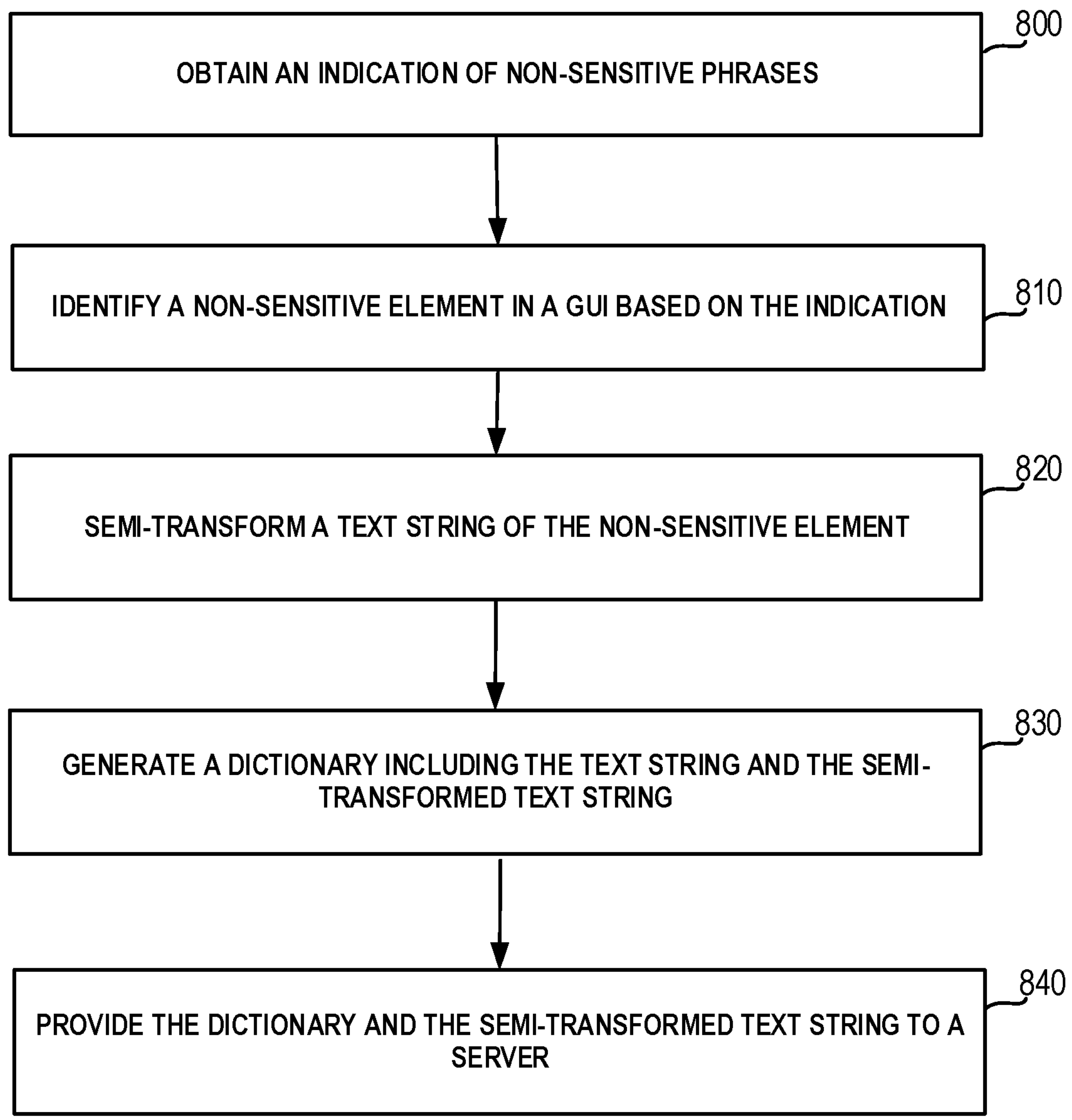
FIG. 8 illustrates a flowchart diagram of a method, in accordance with some exemplary embodiments of the disclosed subject matter.

Referring now to FIG. 8 showing a flowchart diagram of a method, in accordance with some exemplary embodiments of the disclosed subject matter.

On Step 800, indications of one or more non-sensitive elements or phrases may be obtained. Step 800 may be performed in a similar manner as Step 700 of FIG. 7.

On Step 810, a non-sensitive element may be identified in a GUI of an end device, e.g., based on the indications. Step 810 may be performed in a similar manner as Step 710 of FIG. 7.

On Step 820, a text string that was identified as non-sensitive, e.g., at Step 810, may be semi-transformed or fully transformed by a transformation function. In some exemplary embodiments, sending words in plaintext from the client may have one or more disadvantages, e.g., at least since in case a word was mistakenly listed in the whitelist, all the data obtained may be required to be dropped as it may include information that violates privacy regulations, legislation or policies. In some exemplary embodiments, in order to overcome the one or more disadvantages, all text strings from end devices may be provided in a transformed version, e.g., a semi-transformed version or a fully transformed version.

On Step 830, a dictionary may be generated to include the text string and its transformed version. In some exemplary embodiments, the dictionary may be provided to the server along with the transformed text string, e.g., to indicate for each non-sensitive text string its corresponding plaintext version. For example, each entry of the dictionary may include a transformed version of a text string along with a plaintext version of the same text string. In some exemplary embodiments, the server may obtain transformed strings and replace any transformed string that is listed in the dictionary with its corresponding plaintext version, e.g., for analysis purposes.

In some exemplary embodiments, additional phrases and rules may be added to the dictionary, e.g., based on input from a human operator. In some exemplary embodiments, the server may be configured to provide a display to a human operator such as an administrator user. In some exemplary embodiments, the display may be a display of a GUI with GUI elements where at least a portion of the GUI elements may be transformed, e.g., the potentially sensitive portion, while the plaintext GUI elements (if exist) may be determined by the dictionary. In some exemplary embodiments, based on the dictionary, transformed elements may be replaced with the plaintext GUI elements, e.g., in the display, at the server, or the like, for example, so that the administrator user can review them. In some exemplary embodiments, the display may comprise information regarding a plurality of GUI elements including a GUI element that is associated with a text string that is included in the dictionary and is therefore presented in plaintext, and another GUI element that is associated with a transformed text string that is not included in the dictionary, e.g., as it may be considered to be potentially sensitive, and is therefore semi or fully transformed. In some exemplary embodiments, the display may show the text string of the potentially sensitive GUI element in a semi-transformed manner, where only a substring is displayed in plaintext, or in a fully transformed manner without a plaintext portion. In some exemplary embodiments, the administrator user may indicate that the transformed text string that is associated with the other GUI element comprises non-sensitive content. In some exemplary embodiments, an untransformed content of indicated GUI elements may be added to the dictionary, e.g., in response to the indication of the administrator user. For example, the server may request one or more agents of client devices to add the transformed text string to the dictionary, along with its plaintext version. In some exemplary embodiments, the administrator user may indicate that a plaintext text string of the GUI element comprises sensitive content. In some exemplary embodiments, an entry of the dictionary that provides a plaintext version of the text string may be removed, e.g., in response to the indication of the administrator user.

This method may have one or more advantages, at least since in case that the indications of the one or more non-sensitive elements or phrases mistakenly contain a sensitive phrase or element, there will be no need to drop all of the obtained data, as it is all encrypted. Instead, the sensitive phrase or element can merely be deleted from the dictionary instead of going through all the text strings and deleting them from the server. For example, in case a data field representing the end user's address was mistakenly indicated as non-sensitive, once such issue is identified, the dictionary may be updated to resolve the privacy issue. Merely removing the address label from the dictionary may ensure that content of any obtained address cannot be identified. In contrast, if the transformed text string is not provided, in case it is determined that sensitive data was not transformed, the entire record may need to be deleted to protect the privacy of the end user.

Figure 9:
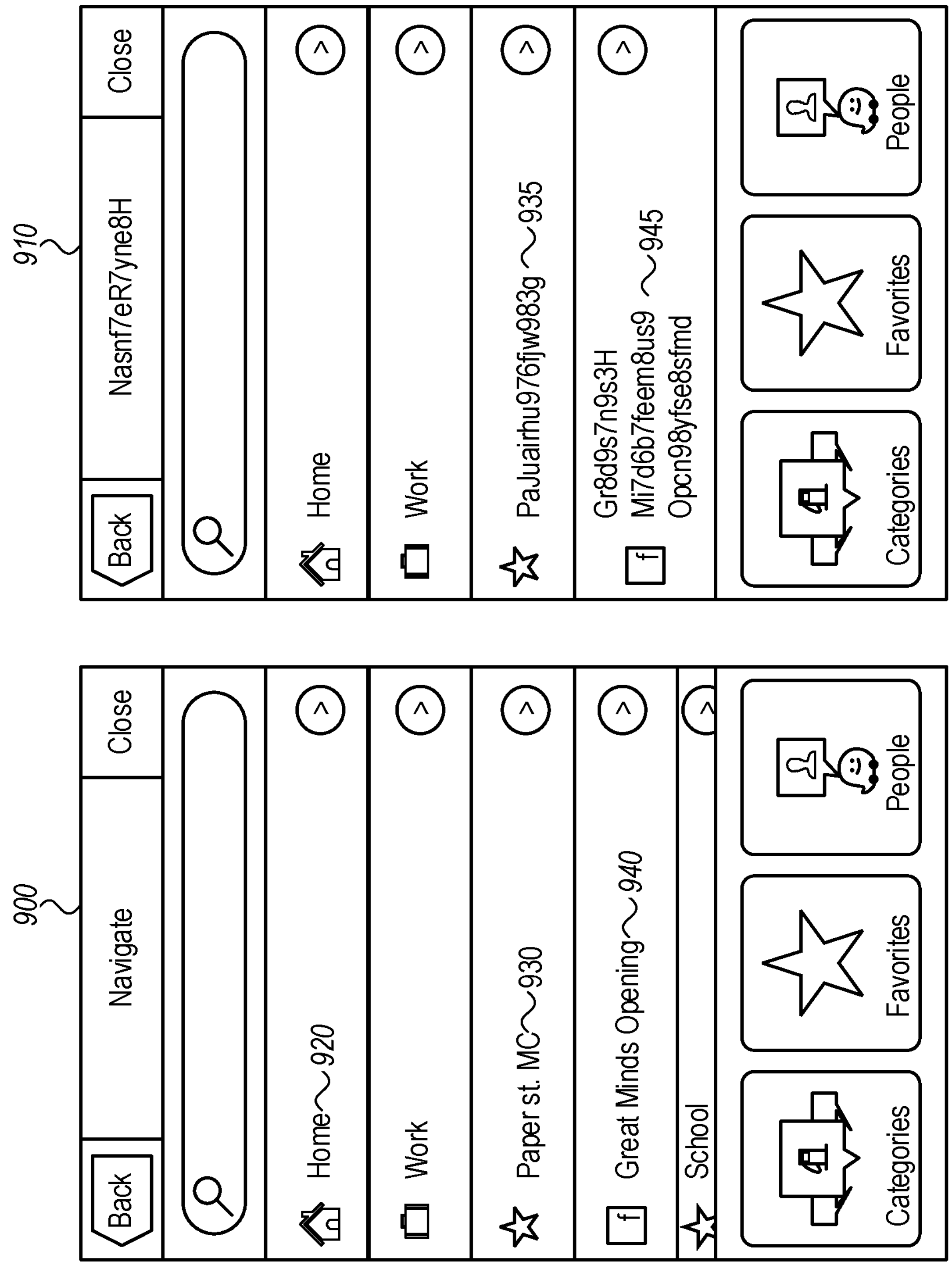
FIG. 9 illustrates a schematic illustration of an exemplary server-side display and a corresponding client-side display, in accordance with some exemplary embodiments of the disclosed subject matter.

Referring now to FIG. 9, showing an exemplary server-side display and a corresponding client-side display, in accordance with some exemplary embodiments of the disclosed subject matter.

In some exemplary embodiments, a Screen 900 of a client-side display may display a program GUI such as a GUI of a website, a web-based application, a native mobile application, a desktop application, or the like. In some exemplary embodiments, as illustrated in FIG. 9, Screen 900 may display a GUI of a mobile navigation application such as a Waze™ application. In some exemplary embodiments, Screen 900 may display text strings of GUI elements in plaintext, which may be sensitive or non-sensitive to a user of the client device.

In some exemplary embodiments, the agent at the client device may obtain one or more indications of sensitive or non-sensitive phrases, sensitive or non-sensitive types of elements, or the like. For example, it may be indicated that the text string "Home" of GUI element 920 in Screen 900 is not sensitive, e.g., as it is merely the text "home", as opposed to a home address. Additionally, or alternatively, the indications may indicate that the denoted strings "Back", and "Close", which are used as captioned for buttons in Screen 900, are not sensitive.

In some exemplary embodiments, based on the indications, the client device may determine that the text strings "Paper St. MC" of GUI element 930 and "Great Minds Opening" of GUI element 940 are potentially sensitive, e.g., as they may not be indicated as non-sensitive by a whitelist, by classification rules, or the like. Alternatively, they may be indicated as sensitive by a blacklist, a trained classifier, one or more rules, or the like.

In some exemplary embodiments, the client device may semi-transform text strings that are to be provided to a server. For example, the client device may semi-transform the entire GUI, portions thereof, or the like. As illustrated in FIG. 9, in some cases, text strings from the entire program's GUI may be provided to a server, e.g., displayed at a server-side Screen 910. According to this example, all the text strings may be semi-transformed according to a transformation function such as a one-way hash function, an encryption function, or the like. In some exemplary embodiments, the client device may semi-transform entire strings or separate words. For example, the entire text string "Paper St. MC" of GUI element 930 may be semi-transformed to obtain string 935, while each word of the text string "Great Minds Opening" of GUI element 940 may be semi-transformed separately to obtain the semi-transformed string 945. In some exemplary embodiments, the client device may or may not add salts to the transformation function.

In some exemplary embodiments, the client device may generate a dictionary to include for each non-sensitive text string, its semi-transformed version. In some exemplary embodiments, in the current case, the dictionary may include the text string "Home" of GUI element 920 along with a semi-transformed version thereof, the text string "Work" along with a semi-transformed version thereof, or the like. In some exemplary embodiments, the dictionary may not include potentially sensitive phrases. For example, the text strings "Paper St. MC" of GUI element 930, which denotes a location searched for by the user, "Great Minds Opening" of GUI element 940 which denotes an event to which the user has navigated, and the title "Navigate" of Screen 900 may not be included in the dictionary.

In some exemplary embodiments, the server may obtain from the client device the semi-transformed strings and the dictionary. In some exemplary embodiments, the server may replace any semi-transformed string that is listed in the dictionary with its corresponding plaintext version as indicated in the dictionary. Screen 910 may be a display provided by the server, e.g., to an administrator user, to a user other than the user of client device, or the like. In some cases, the text strings "Paper St. MC", "Great Minds Opening", and the title "Navigate" of Screen 900 that were not included in the dictionary may be provided in a semi-transformed manner, so that potentially sensitive content may not be restorable at the server. As an example, the semi-transformed string 935 may be displayed at Screen 910 instead of the original text string "Paper St. MC". As another example, the semi-transformed string 945 may be displayed at Screen 910 instead of the original text string "Great Minds Opening".

In some exemplary embodiments, the server may be configured to provide a display of Screen 910 to a human operator such as an administrator user. In some exemplary embodiments, Screen 910 may include a plurality of GUI elements, at least a portion of which may be associated with text strings that are semi-transformed, e.g., such as the semi transformed version of the text strings "Paper St. MC", "Great Minds Opening", and the title "Navigate", or the like. In some exemplary embodiments, Screen 910 may include GUI elements with text strings in a plaintext version, e.g., that were determined based on the dictionary.

In some exemplary embodiments, the administrator user may indicate that a semi-transformed text string that is associated with a GUI element in Screen 910 comprises non-sensitive content. For example, the administrator user may indicate that the title of Screen 910 should not be considered sensitive. In some exemplary embodiments, in response to the indication of the administrator user, the server may communicate with the client device and possibly with one or more other client devices that are using the same program, e.g., Waze™, to indicate that the title of Screen 900 should not be considered sensitive. In some exemplary embodiments, receiving clients may add the title of Screen 900 to a list of indications of non-sensitive information, and upon uploading Screen 900 in a future scenario, the title of Screen 900 may be added to the dictionary and provided to the server. Thereafter, Screen 910 may include the title "Navigate" in a plaintext form (not illustrated).

In some cases, the administrator user may indicate that a plaintext string that is associated with a GUI element in Screen 910 comprises sensitive content (not illustrated). In some exemplary embodiments, in response to such an indication from the administrator user, the corresponding entry in the dictionary may be removed to exclude therefrom the plaintext version of the sensitive text string. As a result, the server may be unable to translate the sensitive content back to its plaintext string in the future.

Figure 10:
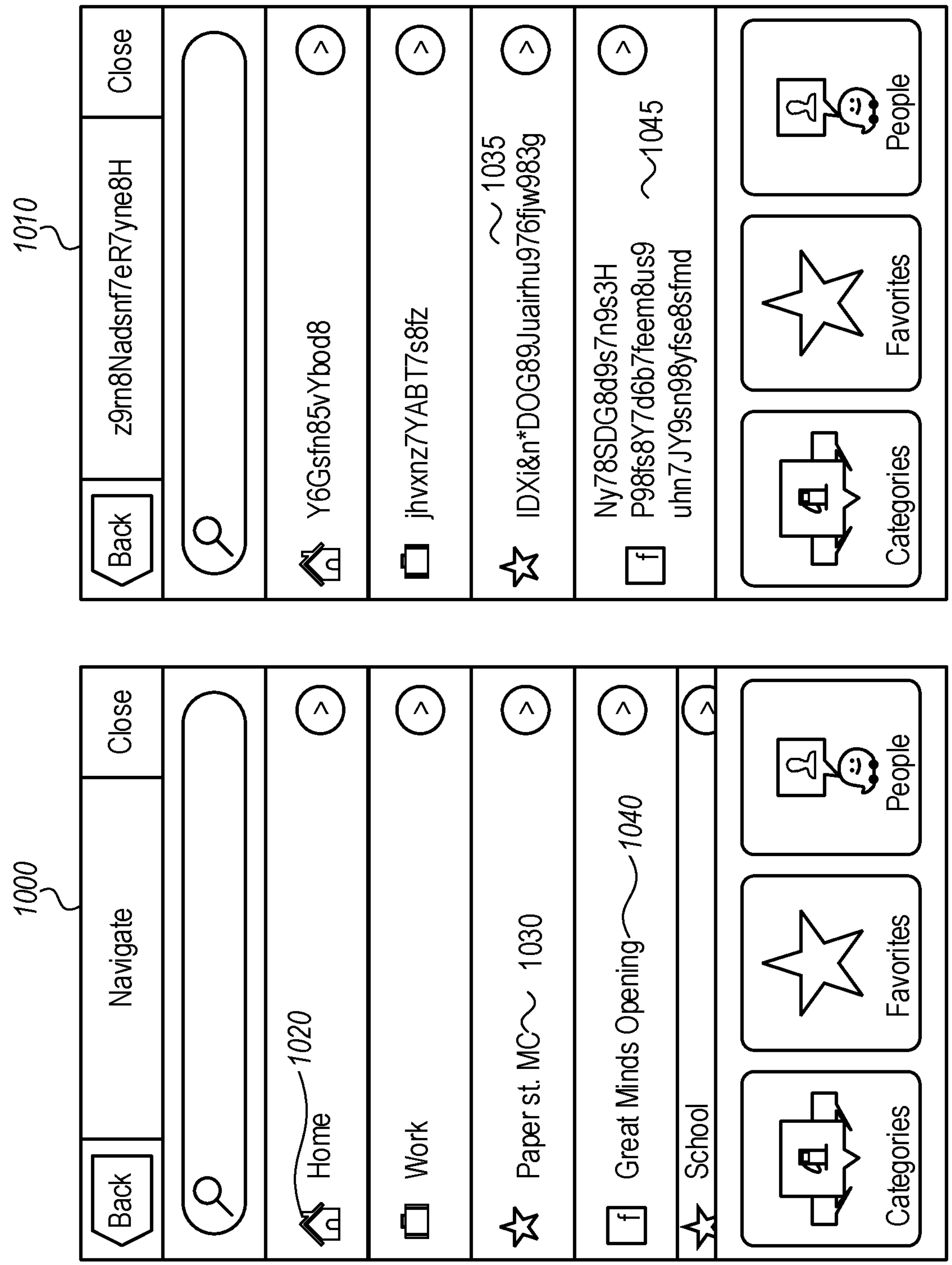
FIG. 10 illustrates a schematic illustration of an exemplary server-side display and a corresponding client-side display, in accordance with some exemplary embodiments of the disclosed subject matter.

Referring now to FIG. 10, showing an exemplary server-side display and a corresponding client-side display, in accordance with some exemplary embodiments of the disclosed subject matter.

In some exemplary embodiments, a Screen 1000 of a client-side display may correspond to Screen 900 of FIG. 9. As illustrated in FIG. 10, in some cases, text strings from the entire program's GUI may be provided to a server, e.g., to be displayed at a server-side Screen 1010. In some exemplary embodiments, the client device may fully transform at least part of the text strings that are to be provided to a server, while not transforming structural elements and non-sensitive text strings that are to be provided to the server. According to this example, at least some of the text strings may be transformed according to a transformation function such as a one-way hash function, an encryption function, or the like.

In some exemplary embodiments, the client device may transform elements of Screen 1000 that are required for rendering Screen 1000 by a rendering engine of the client device. In some exemplary embodiments, text strings of Screen 1000 that define compilation elements such as hidden tags, attributes, or any other structural or non-sensitive text strings in the formatted document may not be selected to be transformed. For example, one or more hidden HTML attributes that define the display of the house image 1020 may be automatically preserved, as they may not be sensitive.

In some exemplary embodiments, the client device may transform entire strings or separate words. For example, the entire text string "Paper St. MC" of GUI element 1030 may be transformed to obtain string 1035, while each word of the text string "Great Minds Opening" of GUI element 1040 may be transformed separately to obtain the transformed string 1045. In some exemplary embodiments, the client device may or may not add salts to the transformation function.

In some exemplary embodiments, the server may obtain from the client device the transformed potentially sensitive text strings, the untransformed structural elements, and the untransformed non-sensitive text strings.

Figure 11:
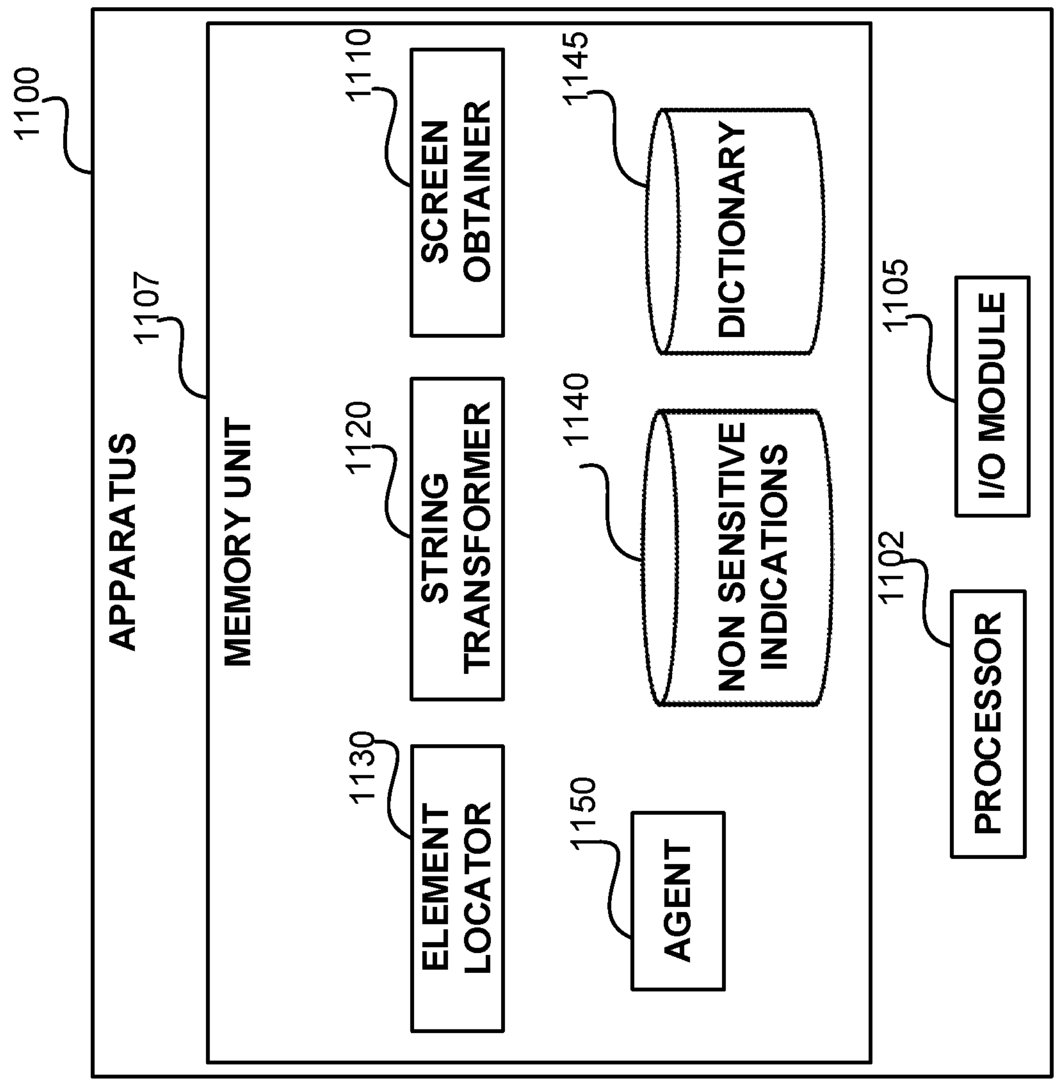
FIG. 11 illustrates a block diagram, in accordance with some exemplary embodiments of the disclosed subject matter.

Referring now to FIG. 11, showing an apparatus in accordance with some exemplary embodiments of the disclosed subject matter. In some exemplary embodiments, Apparatus 1100 may be a client device, such as Client Device 110 of FIG. 1.

In some exemplary embodiments, Apparatus 1100 may comprise a Processor 1102. Processor 1102 may be a CPU, a microprocessor, an electronic circuit, an Integrated Circuit (IC) or the like. Processor 1102 may be utilized to perform computations required by User Device 1100 or any of its subcomponents. Processor 1102 may be configured to execute computer-programs useful in performing the methods of FIGS. 2, 3, 4, 5, 6, 7, 8, or the like.

In some exemplary embodiments of the disclosed subject matter, an Input/Output (I/O) Module 1105 may be utilized to provide an output to and receive input from a user. I/O Module 1105 may be operatively coupled to a touch screen, a mouse, a keyboard or a similar device which may be used for receiving input from the user. I/O Module 1105 may be operatively coupled to a display (not shown), speaker (not shown) or a similar device which may be used for providing feedback or reports to the user. I/O Module 1105 may further be used to transmit and receive information to and from the user or any other apparatus in communication therewith such as Server 120 of FIG. 1. For example, I/O Module 1105 may be configured to receive an element identifier from a server, to provide semi-transformed text strings of GUI elements to the server, to provide fully-transformed text strings of GUI elements to the server, to provide structural compilation elements of a GUI to the server, to provide usage information of GUI elements to the server, to upload one or more dictionaries to the server, or the like.

In some exemplary embodiments, Apparatus 1100 may comprise a Memory Unit 1107. Memory Unit 1107 may be a short-term storage device or long-term storage device. Memory Unit 1107 may be a persistent storage or volatile storage. Memory Unit 1107 may be a disk drive, a Flash disk, a Random-Access Memory (RAM), a memory chip, or the like. In some exemplary embodiments, Memory Unit 1107 may retain program code operative to cause Processor 1102 to perform acts associated with any of the subcomponents of Apparatus 1100. In some exemplary embodiments, Memory Unit 1107 may retain program code operative to cause Processor 1102 to perform acts associated with any of the steps in FIGS. 2, 3, 4, 5, 6, or the like.

Memory Unit 1107 may be utilized to retain Non-sensitive Indications 1140 including one or more indications of non-sensitive phrases or types of elements. Alternatively, Non-sensitive Indications 1140 may indicate sensitive phrases or types of elements. Non-sensitive Indications 1140 may be provided from a server, determined by a software Agent 1150 of Apparatus 1100, determined by a user of Apparatus 1100, or the like.

Memory Unit 1107 may be utilized to retain Dictionary 1145 indicating, for each non-sensitive phrase, a translation from a fully or semi-transformed version to a plaintext version. In some cases, Dictionary 1145 may be provided from a server, determined by Agent 1150 of Apparatus 1100, determined by a user of Apparatus 1100, or the like.

The components detailed below may be implemented as one or more sets of interrelated computer instructions, executed for example by Processor 1102 or by another processor. The components may be arranged as one or more executable files, dynamic libraries, static libraries, methods, functions, services, or the like, programmed in any programming language and under any computing environment.

Memory Unit 1107 may comprise Screen Obtainer 1110. Screen Obtainer 1110 may be configured to obtain one or more portions of a GUI of a program. As an example, a user (not shown) may use Apparatus 1100 for her needs, such as for utilizing a web-based application, a mobile application, a desktop application, or the like. In order to provide services such as walkthroughs, usage analysis, functionality augmentation, or the like, Screen Obtainer 1110 may obtain one or more portions of the current screen in which the user is using. The screen may be obtained by capturing a digital representation of the GUI, such as obtaining an XML file representing the screen, obtaining an HTML file representing the screen, obtaining a layout file representing the screen, obtaining a playground object representing the screen, obtaining a DOM file, such as in JavaScript™-based GUIs, obtaining a screen-capture image of the screen, or the like.

Memory Unit 1107 may comprise String Transformer 1120. String Transformer 1120 may be configured to obtain from Screen Obtainer 1110 text strings of one or more digital representations of GUI elements, and fully or semi-transform at least part of them according to a transformation function, such as a one-way hash function, an encryption function, or the like.

In some exemplary embodiments, String Transformer 1120 may utilize the Non-sensitive Indications 1140 or any other information to identify text strings that are not sensitive. In some exemplary embodiments, String Transformer 1120 may not fully or semi-transform text strings that are indicated as not sensitive, e.g., prior to transmitting them to a server. In some exemplary embodiments, String Transformer 1120 may not transform text strings that are structural text strings, e.g., compilation tags, attributes, or the like. Additionally or alternatively, String Transformer 1120 may add an entry in Dictionary 1145 for text strings that are indicated as not sensitive, fully or semi-transform all of the text strings prior to transmitting them to a server and provide Dictionary 1145 along with the transformed text strings.

Memory Unit 1107 may comprise Element Locator 1130. Element Locator 1130 may be configured to obtain an element identifier globally identifying a first GUI element, such as from a server. In some exemplary embodiments, Element Locator 1130 may apply a query of the element identifier to locate a corresponding second GUI element in the client device.

Memory Unit 1107 may comprise a software Agent 1150. The Agent 1150 may comprise any of Non-sensitive Indications 1140, Dictionary 1145, Screen Obtainer 1110, String Transformer 1120, Element Locator 1130, or portions thereof. In some exemplary embodiments, Agent 1150 may comprise a program product executable by Apparatus 1100, by a computer, or the like, that may be deployed at the client device. In some exemplary embodiments, Agent 1150 may be configured to control or handle any of Non-sensitive Indications 1140, Dictionary 1145, Screen Obtainer 1110, String Transformer 1120, and Element Locator 1130.

An exemplary embodiment of the disclosed subject matter includes performing a walkthrough for an application. For example, the walkthrough may include presenting an augmented display on the user devices' screens that explains or shows how to perform an action in the program, providing a descriptive element in proximity to a GUI element including instructions, or the like. In some exemplary embodiments, in order to create the walkthrough, a user of an end device may perform the target action, e.g., that is the objective of the walkthrough, by performing or selecting a sequence of GUI elements. An agent deployed at the end device may fully transform or semi-transform a text string of each selected GUI element and provide the transformed text strings of the GUI elements to the server. The agent or the server may determine a unique identifier of each selected GUI element based on the transformed text string of the GUI element, a location of the GUI element, a context of the GUI element, structural elements of the GUI elements, or the like. In some cases, the unique identifier may be based on the transformed text strings and include a query that identifies the transformed text strings in the end device. In some exemplary embodiments, after obtaining a unique identifier, the server may provide a walkthrough to a plurality of end devices by providing the unique identifier and an associated augmented display or instructions. Each of the plurality of end devices may locate the current GUI element using the unique identifier.

An exemplary embodiment of the disclosed subject matter includes performing usage analysis, e.g., of a GUI element. For example, it may be desired to obtain statistics regarding a usage of a GUI element such as a "submit" button in a webpage by a plurality of end devices. In some exemplary embodiments, in order to obtain the statistics, the server may provide an element identifier of the GUI element to the plurality of end devices. In some exemplary embodiments, in order to determine the element identifier at the server, an agent deployed at the end device may fully transform or semi-transform the text string "submit" and provide the transformed text string to the server. The server may determine a unique identifier for the text string "submit" based on the transformed text string, a location of the button, GUI element neighbors of the button, a text string of the GUI element, a type of the GUI element, or the like. In some cases, the unique identifier may be based on the transformed text string and may include a query that identifies the transformed text string in end devices. For example, the transformed text string may include a semi-transformed text string "sueaf98hihd", and the query may include searching text strings that start with "su" and have a remaining portion with a hash value of "eaf98hihd". For example, the transformed text string may include a fully transformed text string "Uys787eaf98hihd", and the query may include searching structural elements associated with the text string to find candidate elements and determining whether the transformed values of text strings of the candidate elements are equal to "Uys787eaf98hihd". In some exemplary embodiments, after obtaining a unique identifier, the server may provide the unique identifier to the plurality of end devices and request each end device to accumulate statistics regarding the indicated GUI element. In some exemplary embodiments, each agent of the plurality of end devices may apply the unique identifier to identify the relevant GUI element and accumulate usage statistics of the relevant GUI element. For example, an element may determine a number of times that a user utilized a functionality of the GUI element, or the like, during a timeframe, until receiving instructions indicating to stop, or the like. Next, the plurality of end devices may provide the server with the determined statistics, and the server may process the results for one or more purposes.

An exemplary embodiment of the disclosed subject matter includes performing a word count in a website. For example, it may be desired to obtain a word count of the phrase "Pegasus" in a webpage. In some exemplary embodiments, in order to obtain the word count, the server may provide an element identifier identifying a transformed version of the phrase "Pegasus". For example, the server may request an end device to identify a number of occurrences of the semi-transformed text string "Pe8ha8wg9r8ga" representing the text string "Pegasus". As another example, the server may request an end device to identify a number of occurrences of the fully transformed text string "unzfiY8ha8wg9r8ga" representing the text string "Pegasus". In some exemplary embodiments, an agent deployed at the end device may apply a query of the element identifier to determine that the desired phrase corresponds to the plaintext phrase "Pegasus". In some exemplary embodiments, the agent may perform a query of the phrase "Pegasus" in the requested webpage and provide the result to the server. It may be noted that the server may not be exposed to the content "Pegasus" at any step.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to be implemented at an end device, the method comprising:

obtaining a graphical user interface (GUI) element of a GUI of the end device, wherein the GUI is depicted, at least in part, using a formatted document that is defined in a markup language, wherein the markup language comprises tags attributes of tags, values of attributes, and content of tags, selecting, from the formatted document, a text string to be transformed, wherein the text string is selected from one or more text strings in the formatted document that are not used to define the tags or the attributes, wherein the text string comprises a first portion and a second portion;

transforming the first portion of the text string according to a transformation function, wherein said transforming is not performed on the second portion of the text string, thereby obtaining a semi-transformed text string comprising a transformed portion and a plaintext portion, whereby obtaining a semi-transformed formatted document, wherein the semi-transformed formatted document preserves the structure of the formatted document, wherein the semi-transformed formatted document comprises the semi-transformed text string, wherein the semi-transformed formatted document is rendered by a rendering engine that is capable of rendering the formatted document; and providing to a server the semi-transformed formatted document, whereby the server is enabled to perform string-based analysis of the formatted document without being exposed to a content of the text string.

2. The method of claim 1, further comprising:

obtaining an element identifier of the GUI element, wherein the element identifier comprises the semi-transformed text string;

locating, in the GUI, a second GUI element corresponding to the GUI element, wherein said locating comprises:

performing a string-based search of elements of the GUI using the plaintext portion of the semi-transformed text string to determine a candidate element associated with a text string;

transforming a portion of the text string associated with the candidate element according to the transformation function to obtain a transformed portion of the text string associated with the candidate element; and comparing the transformed portion of the text string associated with the candidate element with the transformed portion of the semi-transformed text string.

3. The method of claim 1, wherein the second portion is one of: a suffix of the text string, a prefix of the text string, and an internal portion of the text string, wherein the second portion having a predetermined size.

4. The method of claim 1 comprising defining a relative location of the second portion within the text string based on a count of candidate elements in the GUI that are associated with text strings corresponding to the second portion at a corresponding relative location.

5. The method of claim 1 comprising defining a number of characters of the second portion based on a count of candidate elements in the GUI that are associated with text strings corresponding to the number of characters of the second portion.

6. The method of claim 1, wherein said providing comprises providing to the server a character count of the first portion, wherein the character count comprises a count of characters in the first portion.

7. The method of claim 1, wherein said transforming the first portion of the text string is performed in response to a determination that the text string is a potentially sensitive phrase.

8. The method of claim 7, wherein the determination that the text string is a potentially sensitive phrase is based on at least one of:

the text string not being included in a whitelist indicating non-sensitive phrases;

the text string being included in a blacklist indicating sensitive phrases; and an application of a classification rule determining whether an examined GUI element is associated with potentially sensitive content.

9. The method of claim 1 further comprising:

in response to a determination that the text string is not a potentially sensitive phrase, adding to a dictionary the semi-transformed text string and the text string; and providing to the server the dictionary, whereby enabling the server to replace the semi-transformed text string with the text string.

10. The method of claim 1, wherein the transformation function comprises at least one the group consisting of: a one-way hash function, a symmetric encryption function, and an asymmetric encryption function.

11. The method of claim 1, wherein a different transformation function is used for different types of GUI elements.

12. The method of claim 1, further comprising: selecting the transformation function for the text string; selecting a second transformation function for a second text string; transforming a first portion of the second text string according to the second transformation function, thereby obtaining a second semi-transformed text string comprising a transformed portion of the second text string and a plaintext portion of the second text string.

13. The method of claim 1, wherein the string-based analysis is a determination of an identifier useful for acquiring the GUI element, wherein the identifier is based on the semi-transformed text string.

14. The method of claim 1, wherein the GUI is at least one of: a website, a web-based application, a native mobile application, and a desktop application.

15. A method comprising:

obtaining a graphical user interface (GUI) element of a GUI of an end device, wherein the GUI element is associated with a text sting that is included in the GUI, wherein the text string comprises a first portion and a second portion;

transforming the first portion of the text string according to a transformation function, wherein said transforming is not performed on the second portion of the text string, thereby obtaining a semi-transformed text string comprising a transformed portion and a plaintext portion;

in response to a determination that the text string is not a potentially sensitive phrase, adding to a dictionary the semi-transformed text string and the text string;

providing to a server the semi-transformed text string, whereby the server is enable to perform string-based analysis without being exposed to a content of the text string; and providing to the server the dictionary, whereby enabling the server to replace the semi-transformed text string with the text string;

wherein the server is configured to provide a display to an administrator user, wherein the display comprises information regarding a plurality of GUI elements including the DUI element and another GUI element, wherein the another GUI element is not included in the dictionary, wherein the display shows the text string associated with the GUI element and a semi-transformed text string associated with the another GUI element; and wherein the display is a display of the GUI with GUI elements wherein a portion of the plurality of GUI elements is associated with text strings that are semi-transformed, wherein the portion of the plurality of GUI elements comprises the another GUI element, wherein the server is configured to receive an indication from the administrator user that the semi-transformed text string associated with the another GUI element comprises non-sensitive content, wherein the method comprises adding untransformed content of the semi-transformed text string to the dictionary.

16. A method comprising:

obtaining a formatted document depicting at least a portion of a Graphical User Interface (GUI) of an end device, wherein the formatted document is defined in a markup language, wherein the formatted document comprises elements defined in the markup language with tags, wherein a first element of the formatted document comprises a content wherein a second element of the formatted document comprises one or more pairs of attributes and corresponding attribute values;

performing a semi-transformation of the formatted document using a transformation function, thereby obtaining a semi-transformed formatted document, wherein the semi-transformed formatted document preserves the structure of the formatted document, wherein the semi-transformed formatted document comprises a transformed version of a text string, wherein the transformed version of the text string is transformed according to the transformation function, wherein said performing the semi-transformation comprises:

selecting, from the formatted document, the text string from one or more text strings in the formatted document that are not used to define the tags or the attributes; and applying the transformation function on the text string; and providing to a second device the semi-transformed formatted document, whereby the second device is enabled to perform string-based analysis of the formatted document without being exposed to a content of the text string.

17. The method of claim 16, wherein said performing the semi-transformation comprises: identifying tokens and keywords in the formatted document, and avoiding from applying the transformation function on the tokens and keywords prior to said providing.

18. The method of claim 16, wherein said selecting the text strings comprises selecting, based on a determination that an attribute defines a sensitive attribute, a text string defining an attribute value of the attribute.

19. A system comprising:

a server;

one or more end devices configured to display a Graphical User Interface (GUI) to one or more respective users, wherein the GUI is depicted at least in part, using a formatted document that is defined in a markup language, wherein the markup language comprises tags, attributes of tags, values of attributes, and content of tags;

wherein an end device of the one or more end devices is configured to:

select, from the formatted document, a text string to be transformed, wherein the text string is selected from one or more text strings in the formatted document that are not used to define the tags or the attributes, wherein the text string comprises a first portion and a second portion;

transform the first portion of the text string according to a transformation function, wherein said transforming is not performed on the second portion of the text string, thereby obtaining a semi-transformed text string comprising a transformed portion and a plain-text portion, whereby obtaining a semi-transformed formatted document, wherein the semi-transformed formatted document preserves the structure of the formatted document, wherein the semi-transformed formatted document comprises the semi-transformed text string, wherein the semi-transformed formatted document is renderable by a rendering engine that is capable of rendering the formatted document; and provide the semi-transformed formatted document to said server, whereby said server is enabled to perform string-based analysis of the formatted document without being exposed to a content of the text string.

20. A server comprising:

a server;

one or more end devices configured to display a Graphical User Interface (GUI) to one or more respective users, wherein an end device of the one or more end devices is configured to:

obtain a GUI element of the GUI, wherein the GUI element is associated with a text string that is included in the GUI, wherein the text string comprises a first portion and a second portion;

transform the first portion of the text string according to a transformation function, wherein said transforming is not performed on the second portion of the text string, thereby obtaining a semi-transformed text string comprising a transformed portion and a plain-text portion;

in response to a determination that the text string is not a potentially sensitive phrase, adding to a dictionary the semi-transformed text string and the text string;

provide to said server the semi-transformed text string, whereby said server is enabled to perform string-based analysis without being exposed to a content of the text string; and provide to the server the dictionary, whereby enabling the server to replace the semi-transformed text string with the text string;

wherein said server is configured to provide a display to an administrator user, wherein the display comprises information regarding a plurality of GUI elements including the GUI element and another GUI element, wherein the another GUI element is not included in the dictionary, wherein the display shows the text string associated with the GUI element and a semi-transformed text string associated with the another GUI element, wherein the display is a display of the GUI with GUI elements wherein a portion of the plurality of GUI elements is associated with text strings that are semi-transformed, wherein the portion of the plurality of GUI elements comprises the another GUI element, wherein the system is configured to add an untransformed content of the semi-transformed text string to the dictionary based on an indication from the administrator user indicating that the semi-transformed text string associated with the another GUI element comprises non-sensitive content.

* * * * *